(12) United States Patent
Ketchum et al.

(10) Patent No.: US 7,613,248 B2
(45) Date of Patent: Nov. 3, 2009

(54) SIGNAL PROCESSING WITH CHANNEL EIGENMODE DECOMPOSITION AND CHANNEL INVERSION FOR MIMO SYSTEMS

(75) Inventors: John W. Ketchum, Harvard, MA (US); Jay R. Walton, Westford, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/179,442

(22) Filed: Jun. 24, 2002

(65) Prior Publication Data

US 2003/0235255 A1   Dec. 25, 2003

(51) Int. Cl.
*H04L 27/00* (2006.01)
*H03K 9/00* (2006.01)

(52) U.S. Cl. ............... 375/296; 375/295; 375/297; 375/299; 375/316; 375/346; 375/347; 375/349

(58) Field of Classification Search .......... 375/285, 375/295, 316, 296, 348, 297, 299, 346, 347, 375/349

See application file for complete search history.

(56) References Cited

U.S. PATENT DOCUMENTS

| | | | |
|---|---|---|---|
| 6,061,327 A * | 5/2000 | Demoulin et al. ............ 370/208 |
| 6,285,859 B1 * | 9/2001 | Fernandez Duran et al. ..... 455/63.1 |
| 6,314,147 B1 * | 11/2001 | Liang et al. ............... 375/346 |
| 6,345,036 B1 | 2/2002 | Sudo et al. |
| 6,377,631 B1 * | 4/2002 | Raleigh ................... 375/299 |
| 6,396,885 B1 * | 5/2002 | Ding et al. ................ 375/347 |
| 6,493,399 B1 * | 12/2002 | Xia et al. ................. 375/296 |
| 6,751,187 B2 | 6/2004 | Walton et al. |

(Continued)

FOREIGN PATENT DOCUMENTS

| EP | 0549019 | 6/1993 |
|---|---|---|
| WO | WO 01076110 | 10/2001 |
| WO | 0205506 A | 1/2002 |

OTHER PUBLICATIONS

Bliss et al; "MIMO communication capacity using infinite dimension random matrix eigenvalue distributions"; Conference Record of the Thirty-Fifth Asilomar Conference, vol. 2, Nov. 4-7, 2001 pp. 969-974.*

(Continued)

*Primary Examiner*—Jason M. Perilla
(74) *Attorney, Agent, or Firm*—Donald Kordich; Ross L. Franks

(57) ABSTRACT

Techniques for processing a data transmission at a transmitter and receiver, which use channel eigen-decomposition, channel inversion, and (optionally) "water-pouring". At the transmitter, (1) channel eigen-decomposition is performed to determine eigenmodes of a MIMO channel and to derive a first set of steering vectors, (2) channel inversion is performed to derive weights (e.g., one set for each eigenmode) used to minimize ISI distortion, and (3) water-pouring may be performed to derive scaling values indicative of the transmit powers allocated to the eigenmodes. The first set of steering vectors, weights, and scaling values are used to derive a pulse-shaping matrix, which is used to precondition modulation symbols prior to transmission. At the receiver, channel eigen-decomposition is performed to derive a second set of steering vectors, which are used to derive a pulse-shaping matrix used to condition received symbols such that orthogonal symbol streams are recovered.

36 Claims, 9 Drawing Sheets

U.S. PATENT DOCUMENTS

| | | | |
|---|---|---|---|
| 6,956,907 | B2 | 10/2005 | Ketchum |
| 7,020,482 | B2 | 3/2006 | Medvedev et al. |
| 7,072,413 | B2 | 7/2006 | Walton et al. |
| 2001/0036235 | A1* | 11/2001 | Kadous ................ 375/341 |
| 2002/0067309 | A1* | 6/2002 | Baker et al. ............ 342/367 |
| 2002/0191535 | A1* | 12/2002 | Sugiyama et al. ........ 370/208 |
| 2003/0048856 | A1 | 3/2003 | Ketchum et al. |
| 2003/0113312 | A1 | 6/2003 | Elias et al. |
| 2003/0125040 | A1 | 7/2003 | Walton et al. |
| 2003/0185309 | A1* | 10/2003 | Pautler et al. ........... 375/257 |
| 2003/0190897 | A1* | 10/2003 | Lei et al. ............... 455/101 |
| 2008/0130789 | A1* | 6/2008 | Copeland et al. ........ 375/297 |

OTHER PUBLICATIONS

Wallace et al; "Measured characteristics of the MIMO wireless channel"; Vehicular Technology Conference, IEEE VTS 54th, vol. 4, Oct. 7-11, 2001 pp. 2038-2042.*

Sampath et al. "Joint Transmit and Receive Optimization for High Data Rate Wireless Communication Using Multiple Antennas," Signals, Systmes, and Computers, IEEE Conference Record of the Thirty-Third Asilomar Conference, Piscataway, NJ, Oct. 24-27, 1999, pp. 215-219.

Kim et al. "Transmission Optimization with a Space-Time Filter at Low SNR Wireless Environment," Globecom 1999, vol. 1B, Dec. 5, 1999, pp. 889-893.

Burr et al. "Adaptive Space-Time Signal Processing and Coding," IEEE, vol. 2, Oct. 22, 2000, pp. 710-714.

International Search Report, PCT/US03/019464, International Search Authority, European Patent Office, Jun. 10, 2003.

Kim and Cioffi, "Transmission Qptimization with a Space-Time Filter at Low SNR Wireless Environment," Global Telecommunications Conference, pp. 889-893, Dec. 5-9, Rio de Janiero, Brazil (1999).

* cited by examiner

SIGNAL PROCESSING WITH CHANNEL EIGENMODE DECOMPOSITION AND CHANNEL INVERSION FOR MIMO SYSTEMS

BACKGROUND

1. Field

The present invention relates generally to data communication, and more specifically to techniques for performing signal processing with channel eigenmode decomposition and channel inversion for multiple-input multiple-output (MIMO) communication systems.

2. Background

A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial subchannel of the MIMO channel and corresponds to a dimension. The MIMO system can provide improved performance (e.g., increased transmission capacity) if the additional dimensionalities created by the multiple transmit and receive antennas are utilized.

The spatial subchannels of a wideband MIMO system may encounter different channel conditions due to various factors such as fading and multipath. Each spatial subchannel may thus experience frequency selective fading, which is characterized by different channel gains at different frequencies (i.e., different frequency bins or subbands) of the overall system bandwidth. With frequency selective fading, each spatial subchannel may achieve different signal-to-noise-and-interference ratios (SNRs) for different frequency bins. Consequently, the number of information bits per modulation symbol (or data rate) that may be transmitted at different frequency bins of each spatial subchannel for a particular level of performance (e.g., 1% packet error rate) may be different from bin to bin. Moreover, because the channel conditions typically vary with time, the supported data rates for the bins of the spatial subchannels also vary with time.

To combat frequency selective fading in a wideband channel, orthogonal frequency division multiplexing (OFDM) may be used to effectively partition the system bandwidth into a number of ($N_F$) subbands (which may also be referred to as frequency bins or subchannels). With OFDM, each frequency subchannel is associated with a respective subcarrier upon which data may be modulated. For a MIMO system that utilizes OFDM (i.e., a MIMO-OFDM system), each frequency subchannel of each spatial subchannel may be viewed as an independent transmission channel.

A key challenge in a coded communication system is the selection of the appropriate data rates and coding and modulation schemes to be used for a data transmission based on channel conditions. The goal of this selection process is to maximize throughput while meeting quality objectives, which may be quantified by a particular packet error rate (PER), certain latency criteria, and so on.

One straightforward technique for selecting data rates and coding and modulation schemes is to "bit load" each transmission channel in the MIMO-OFDM system according to its transmission capability, which may be quantified by the channel's short-term average SNR. However, this technique has several major drawbacks. First, coding and modulating individually for each transmission channel can significantly increase the complexity of the processing at both the transmitter and receiver. Second, coding individually for each transmission channel may greatly increase coding and decoding delay. And third, a high feedback rate would be needed to send channel state information (CSI) indicative of the channel conditions (e.g., the gain, phase, and SNR) of each transmission channel.

For a MIMO system, transmit power is another parameter that may be manipulated to maximize throughput. In general, the overall throughput of the MIMO system may be increased my allocating more transmit power to transmission channels with greater transmission capabilities. However, allocating different amounts of transmit power to different frequency bins of a given spatial subchannel tends to exaggerate the frequency selective nature of the spatial subchannel. It is well known that frequency selective fading causes inter-symbol interference (ISI), which is a phenomenon whereby each symbol in a received signal acts as distortion to subsequent symbols in the received signal. The ISI distortion degrades performance by impacting the ability to correctly detect the received symbols. To mitigate the deleterious effects of ISI, equalization of the received symbols would need to be performed at the receiver. Thus, a major drawback in frequency-domain power allocation is the additional complexity at the receiver to combat the resultant additional ISI distortion.

There is therefore a need in the art for techniques to achieve high overall throughput in a MIMO system without having to individually code each transmission channel and which mitigate the deleterious effects of ISI.

SUMMARY

Techniques are provided herein for processing a data transmission at a transmitter and a receiver of a MIMO system such that high performance (e.g., high overall throughput) is achieved. In an aspect, a time-domain implementation is provided which uses frequency-domain channel eigen-decomposition, channel inversion, and (optionally) "water-pouring" results to derive pulse-shaping and beam-steering solutions for the transmitter and receiver.

Channel eigen-decomposition is performed at the transmitter to determine the eigenmodes (i.e., the spatial subchannels) of a MIMO channel and to obtain a first set of steering vectors, which are used to precondition modulation symbols prior to transmission over the MIMO channel. Channel eigen-decomposition may be performed based on an estimated channel response matrix, which is an estimate of the (time-domain or frequency-domain) channel response of the MIMO channel. Channel eigen-decomposition is also performed at the receiver to obtain a second set of steering vectors, which are used to condition received symbols such that orthogonal symbol streams are recovered at the receiver.

Channel inversion is performed at the transmitter to derive weights, which are used to minimize or reduce the amount of ISI distortion at the receiver. In particular, the channel inversion may be performed for each eigenmode used for data transmission. One set of weights may be derived for each eigenmode based on the estimated channel response matrix for the MIMO channel and is used to invert the frequency response of the eigenmode.

Water-pouring analysis may (optionally) be used to more optimally allocate the total available transmit power to the eigenmodes of the MIMO channel. In particular, eigenmodes with greater transmission capabilities may be allocated more transmit power, and eigenmodes with transmission capabilities below a particular threshold may be omitted from use (e.g., by allocating these bad eigenmodes with zero transmit power). The transmit power allocated to each eigenmode then determines the data rate and possibly the coding and modulation scheme to be used for the eigenmode.

At the transmitter, data is initially processed (e.g., coded and modulated) in accordance with a particular processing scheme to provide a number of modulation symbol streams (e.g., one modulation symbol stream for each eigenmode). An estimated channel response matrix for the MIMO channel is obtained (e.g., from the receiver) and decomposed (e.g., in the frequency domain, using channel eigen-decomposition) to obtain a set of matrices of right eigen-vectors and a set of matrices of singular values. A number of sets of weights are then derived based on the matrices of singular values, with each set of weights being used to invert the frequency response of a respective eigenmode used for data transmission. Water-pouring analysis may also be performed based on the matrices of singular values to obtain a set of scaling values indicative of the transmit powers allocated to the eigenmodes. A pulse-shaping matrix for the transmitter is then derived based on the matrices of right eigen-vectors, the weights, and the scaling values (if available). The pulse-shaping matrix comprises steering vectors, which are used to precondition the streams of modulation symbols to obtain streams of preconditioned symbols to be transmitted over the MIMO channel.

At the receiver, the estimated channel response matrix is also obtained (e.g., based on pilot symbols sent from the transmitter) and decomposed to obtain a set of matrices of left eigen-vectors. A pulse-shaping matrix for the receiver is then derived based on the matrices of left eigen-vectors and used to condition a number of received symbol streams to obtain a number of recovered symbol streams. The recovered symbols are further processed (e.g., demodulated and decoded) to recover the transmitted data.

Various aspects and embodiments of the invention are described in further detail below. The invention further provides methods, digital signal processors, transmitter and receiver units, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The techniques described herein for processing a data transmission at a transmitter and receiver may be used for various wireless communication systems. For clarity, various aspects and embodiments of the invention are described specifically for a multiple-input multiple-output (MIMO) communication system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial subchannel of the MIMO channel. The number of spatial subchannels is determined by the number of eigenmodes for the MIMO channel, which in turn is dependent on a channel response matrix that describes the response between the $N_T$ transmit and $N_R$ receive antennas.

Figure 1:
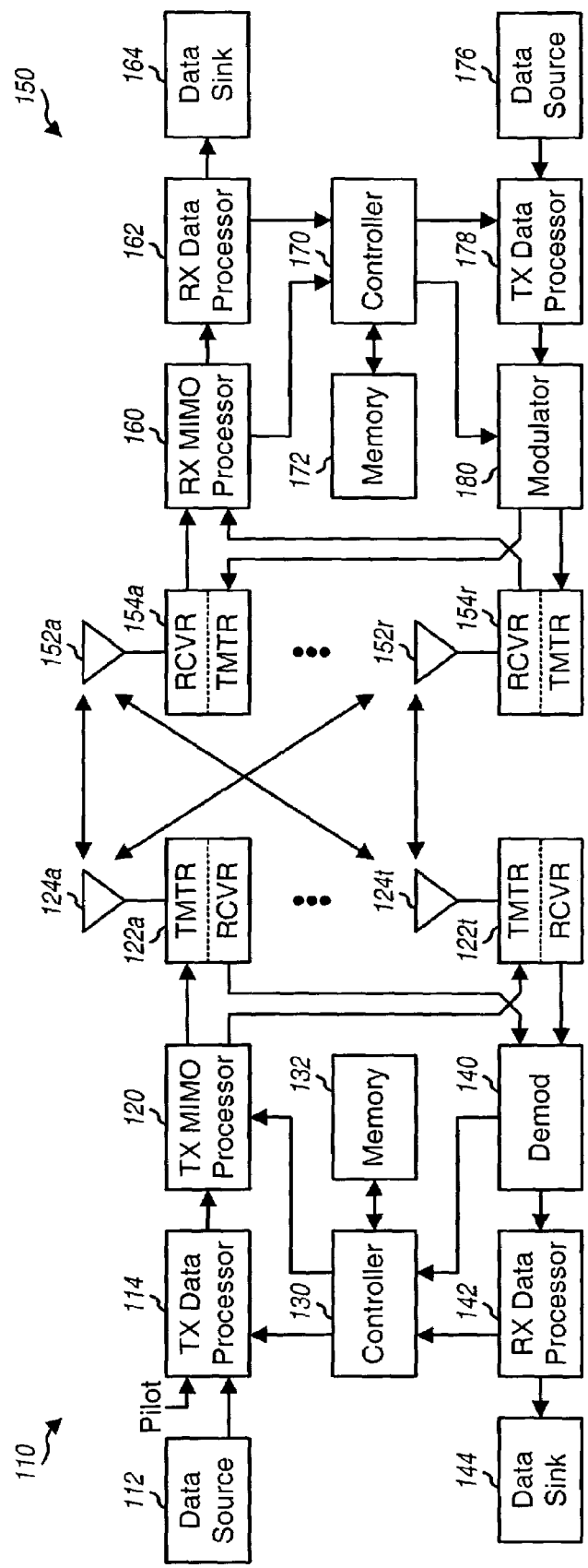
FIG. 1 is a block diagram of an embodiment of a transmitter system and a receiver system in a MIMO system.

FIG. 1 is a block diagram of an embodiment of a transmitter system 110 and a receiver system 150, which are capable of implementing various signal processing techniques described herein.

At transmitter system 110, traffic data is provided from a data source 112 to a transmit (TX) data processor 114, which formats, codes, and interleaves the traffic data based on one or more coding schemes to provide coded data. The coded traffic data may then be multiplexed with pilot data using, for example, time division multiplex (TDM) or code division multiplex (CDM), in all or a subset of the data streams to be transmitted. The pilot data is typically a known data pattern processed in a known manner, if at all. The multiplexed pilot and coded traffic data is interleaved and then modulated (i.e., symbol mapped) based on one or more modulation schemes to provide modulation symbols. In an embodiment, TX data processor 114 provides one modulation symbol stream for each spatial subchannel used for data transmission. The data rate, coding, interleaving, and modulation for each modulation symbol stream may be determined by controls provided by a controller 130.

The modulation symbols are then provided to a TX MIMO processor 120 and further processed. In a specific embodiment, the processing by TX MIMO processor 120 includes (1) determining an estimated channel frequency response matrix for the MIMO channel, (2) decomposing this matrix to determine the eigenmodes of the MIMO channel and to derive a set of "steering" vectors for the transmitter, one vector for the modulation symbol stream to be transmitted on each spatial subchannel, (3) deriving a transmit spatio-temporal pulse-shaping matrix based on the steering vectors and a weighting matrix indicative of the transmit powers assigned to the frequency bins of the eigenmodes, and (4) preconditioning the modulation symbols with the pulse-shaping matrix to provide preconditioned modulation symbols. The processing by TX MIMO processor 120 is described in further detail below. Up to $N_T$ streams of preconditioned symbols are then provided to transmitters (TMTR) 122a through 122t.

Each transmitter 122 converts a respective preconditioned symbol stream into one or more analog signals and further conditions (e.g., amplifies, filters, and frequency upconverts) the analog signals to generate a modulated signal suitable for transmission over the MIMO channel. The modulated signal from each transmitter 122 is then transmitted via a respective antenna 124 to the receiver system.

At receiver system 150, the transmitted modulated signals are received by $N_R$ antennas 152a through 152r, and the received signal from each antenna 152 is provided to a respective receiver (RCVR) 154. Each receiver 154 conditions (e.g., filters, amplifies, and frequency downconverts) the received signal, digitizes the conditioned signal to provide a stream of samples, and further processes the sample stream to provide a stream of received symbols. An RX MIMO processor 160 then receives and processes the $N_R$ received symbol streams to provide $N_T$ streams of recovered symbols, which are estimates of the modulation symbols transmitted from the transmitter system. In an embodiment, the processing by RX MIMO processor 160 may include (1) determining the estimated channel frequency response matrix for the MIMO channel, (2) decomposing this matrix to derive a set of steering vectors for the receiver, (3) deriving a receive spatio-temporal pulse-shaping matrix based on the steering vectors, and (4) conditioning the received symbols with the pulse-shaping matrix to provide the recovered symbols. The processing by RX MIMO processor 160 is described in further detail below.

A receive (RX) data processor 162 then demodulates, deinterleaves, and decodes the recovered symbols to provide decoded data, which is an estimate of the transmitted traffic data. The processing by RX MIMO processor 160 and RX data processor 162 is complementary to that performed by TX MIMO processor 120 and TX data processor 114, respectively, at transmitter system 110.

RX MIMO processor 160 may further derive channel impulse responses for the MIMO channel, received noise power and/or signal-to-noise-and-interference ratios (SNRs) for the spatial subchannels, and so on. RX MIMO processor 160 would then provide these quantities to a controller 170. RX data processor 162 may also provide the status of each received packet or frame, one or more other performance metrics indicative of the decoded results, and possibly other information. Controller 170 then derives channel state information (CSI), which may comprise all or some of the information received from RX MIMO processor 160 and RX data processor 162. The CSI is processed by a TX data processor 178, modulated by a modulator 180, conditioned by transmitters 154a through 154r, and sent back to transmitter system 110.

At transmitter system 110, the modulated signals from receiver system 150 are received by antennas 124, conditioned by receivers 122, and demodulated by a demodulator 140 to recover the CSI transmitted by the receiver system. The CSI is then provided to controller 130 and used to generate various controls for TX data processor 114 and TX MIMO processor 120.

Controllers 130 and 170 direct the operation at the transmitter and receiver systems, respectively. Memories 132 and 172 provide storage for program codes and data used by controllers 130 and 170, respectively.

Techniques are provided herein for achieving high performance (e.g., high overall system throughput) via a time-domain implementation that uses frequency-domain channel eigen-decomposition, channel inversion, and (optionally) water-pouring results to derive time-domain pulse-shaping and beam-steering solutions for the transmitter and receiver.

Channel eigen-decomposition is performed at the transmitter to determine the eigenmodes of the MIMO channel and to derive a first set of steering vectors, which are used to precondition the modulation symbols. Channel eigen-decomposition is also performed at the receiver to derive a second set of steering vectors, which are used to condition the received symbols such that orthogonal symbol streams are recovered at the receiver. The preconditioning at the transmitter and the conditioning at the receiver orthogonalize the symbol streams transmitted over the MIMO channel.

Channel inversion is performed at the transmitter to flatten the frequency response of each eigenmode (or spatial subchannel) used for data transmission. As noted above, frequency selective fading causes intersymbol interference (ISI), which can degrade performance by impacting the ability to correctly detect the received symbols at the receiver. Conventionally, the frequency selective fading may be compensated for at the receiver by performing equalization on the received symbol streams. However, equalization increases the complexity of the receiver processing. With the inventive techniques, the channel inversion is performed at the transmitter to account for the frequency selective fading and to mitigate the need for equalization at the receiver.

Water-pouring (or water-filling) analysis is used to more optimally allocate the total available transmit power in the MIMO system to the eigenmodes such that high performance is achieved. The transmit power allocated to each eigenmode may then determine the data rate and the coding and modulation scheme to be used for the eigenmode.

These various processing techniques are described in further detail below.

The techniques described herein provide several potential advantages. First, with time-domain eigenmode decomposition, the maximum number of eigenmodes with different SNRs is given by min ($N_T$, $N_R$). If one independent data stream is transmitted on each eigenmode and each data stream is independently processed, then the maximum number of different coding/modulation schemes is also given by min ($N_T$, $N_R$). It is also possible to make the received SNRs for the data streams essentially the same, thereby further simplifying the coding/modulation. The techniques described herein can thus greatly simplify the coding/modulation for a data transmission by avoiding the per-bin bit allocation required to approach channel capacity in MIMO-OFDM systems that utilize frequency-domain water-pouring.

Second, the channel inversion at the transmitter results in recovered symbol streams at the receiver that do not require equalization. This then reduces the complexity of the receiver processing. In contrast, other wide-band time-domain techniques typically require complicated space-time equalization to recover the symbol streams.

Third, the time-domain signaling techniques described herein can more easily integrate the channel/pilot structures of various CDMA standards, which are also based on time-domain signaling. Implementation of the channel/pilot structures may be more complicated in OFDM-based systems that perform frequency-domain signaling.

Figure 2:
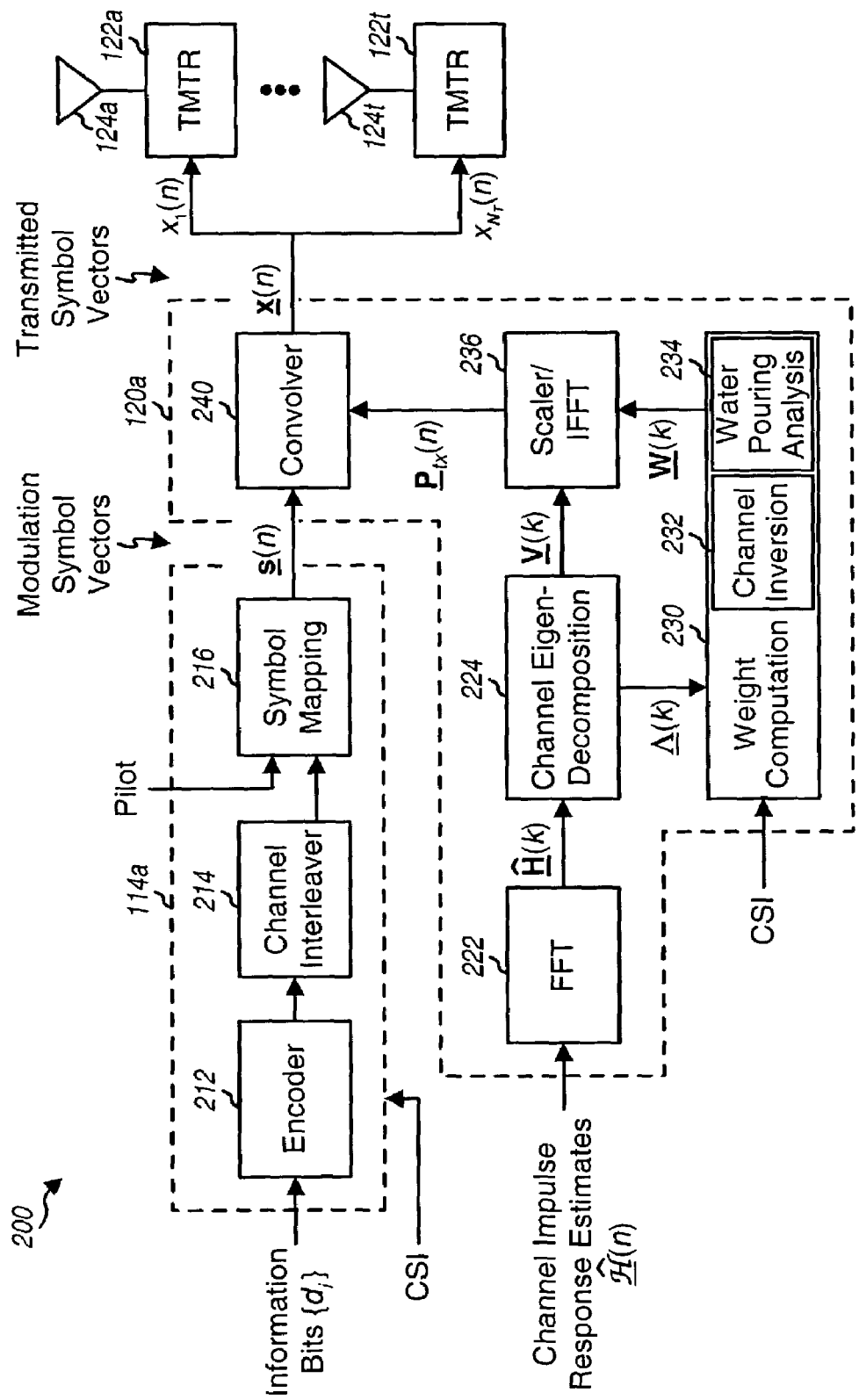
FIG. 2 is a block diagram of a transmitter unit within the transmitter system.

FIG. 2 is a block diagram of an embodiment of a transmitter unit 200, which is capable of implementing various processing techniques described herein. Transmitter unit 200 is an embodiment of the transmitter portion of transmitter system 110 in FIG. 1. Transmitter unit 200 includes (1) a TX data processor 114a that receives and processes traffic and pilot data to provide $N_T$ modulation symbol streams and (2) a TX MIMO processor 120a that preconditions the modulation symbol streams to provide $N_T$ preconditioned symbol streams. TX data processor 114a and TX MIMO processor 120a are one embodiment of TX data processor 114 and TX MIMO processor 120, respectively, in FIG. 1.

In the specific embodiment shown in FIG. 2, TX data processor 114a includes an encoder 212, a channel interleaver 214, and a symbol mapping element 216. Encoder 212 receives and codes the traffic data (i.e., the information bits, $d_i$) in accordance with one or more coding schemes to provide coded bits. The coding increases the reliability of the data transmission. In an embodiment, a separate coding scheme may be used for the information bits for each eigenmode (or spatial subchannel) selected for use for data transmission. In alternative embodiments, a separate coding scheme may be used for each subset of spatial subchannels, or a common coding scheme may be used for all spatial subchannels. The coding scheme(s) to be used are determined by controls from controller 130 and may be selected based on the CSI received from the receiver system. Each selected coding scheme may include any combination of cyclic redundancy check (CRC), convolutional coding, Turbo coding, block coding, and other coding, or no coding at all.

Channel interleaver 214 interleaves the coded bits based on one or more interleaving schemes. Typically, each selected coding scheme is associated with a corresponding interleaving scheme. The interleaving provides time diversity for the coded bits, permits the data to be transmitted based on an average SNR of each spatial subchannel used for the data transmission, combats fading, and further removes correlation between coded bits used to form each modulation symbol.

Symbol mapping element 216 then receives and multiplexes pilot data with the interleaved data and further maps the multiplexed data in accordance with one or more modulation schemes to provide modulation symbols. A separate modulation scheme may be used for each spatial subchannel selected for use, or for each subset of spatial subchannels. Alternatively, a common modulation scheme may be used for all selected spatial subchannels.

The symbol mapping for each spatial subchannel may be achieved by grouping sets of bits to form data symbols (each of which may be a non-binary value) and mapping each data symbol to a point in a signal constellation corresponding to the modulation scheme selected for use for that spatial subchannel. The selected modulation scheme may be QPSK, M-PSK, M-QAM, or some other scheme. Each mapped signal point is a complex value and corresponds to a modulation symbol. Symbol mapping element 216 provides a vector of modulation symbols for each symbol period, with the number of modulation symbols in each vector corresponding to the number of spatial subchannels selected for use for that symbol period. Symbol mapping element 216 thus provides up to $N_T$ modulation symbol streams. These streams collectively form a sequence of vectors, with are also referred to as the modulation symbol vectors, $\underline{s}(n)$, with each such vector including up to $N_S$ modulation symbols to be transmitted on up to $N_S$ spatial subchannels for the n-th symbol period.

Within TX MIMO processor 120a, the response of the MIMO channel is estimated and used to precondition the modulation symbols prior to transmission to the receiver system. In a frequency division duplexed (FDD) system, the downlink and uplink are allocated different frequency bands, and the channel responses for the downlink and uplink may not be correlated to a sufficient degree. For the FDD system, the channel response may be estimated at the receiver and sent back to the transmitter. In a time division duplexed (TDD) system, the downlink and uplink share the same frequency band in a time division multiplexed manner, and a high degree of correlation may exist between the downlink and uplink channel responses. For the TDD system, the transmitter system may estimate the uplink channel response (e.g., based on the pilot transmitted by the receiver system on the uplink) and may then derive the downlink channel response by accounting for any differences such as those between the transmit and receive antenna array manifolds.

In an embodiment, the channel response estimates are provided to TX MIMO processor 120a as a sequence of $N_R \times N_T$ matrices, $\underline{\hat{\mathcal{H}}}(n)$, of time-domain samples. This sequence of matrices is collectively referred to as a channel impulse response matrix, $\underline{\hat{\mathcal{H}}}$. The (i,j)-th element, $\hat{h}_{i,j}$, of the estimated channel impulse response matrix, $\underline{\hat{\mathcal{H}}}$, for i=(1, 2, ..., $N_R$) and j=(1, 2, ..., $N_T$), is a sequence of samples that represents the sampled impulse response of the propagation path from the j-th transmit antenna to the i-th receive antenna.

Within TX MIMO processor 120a, a fast Fourier transformer 222 receives the estimated channel impulse response matrix, $\underline{\hat{\mathcal{H}}}$ (e.g., from the receiver system) and derives the corresponding estimated channel frequency response matrix, $\underline{\hat{H}}$, by performing a fast Fourier transform (FFT) on the matrix $\underline{\hat{\mathcal{H}}}$ (i.e., $\underline{\hat{H}}$=FFT[$\underline{\hat{\mathcal{H}}}$]). This may be achieved by performing an $N_F$-point FFT on a sequence of $N_F$ samples for each element of $\underline{\hat{\mathcal{H}}}$ to derive a set of $N_F$ coefficients for the corresponding element of $\underline{\hat{H}}$, where $N_F$ corresponds to the number of frequency bins for the FFT (i.e., the length of the FFT). The $N_R \cdot N_T$ elements of $\underline{\hat{H}}$ are thus $N_R \cdot N_T$ sets of coefficients representing the frequency responses of the propagation paths between the $N_T$ transmit antennas and $N_R$ receive antennas. Each element of $\underline{\hat{H}}$ is the FFT of the corresponding element of $\underline{\hat{\mathcal{H}}}$. The estimated channel frequency response matrix, $\underline{\hat{H}}$, may also be viewed as comprising a set of $N_F$ matrices, $\underline{\hat{H}}(k)$ for k=(0, 1, ..., $N_F$-1).

Channel Eigen-Decomposition

A unit 224 then performs eigen-decomposition of the MIMO channel used for data transmission. In one embodiment for performing channel eigen-decomposition, unit 224 computes the singular value decomposition (SVD) of the estimated channel frequency response matrix, $\underline{\hat{H}}$. In an embodiment, the singular value decomposition is performed for each matrix $\underline{\hat{H}}(k)$, for k=(0, 1, ..., $N_F$-1). The singular value decomposition of matrix $\underline{\hat{H}}(k)$ for frequency bin k (or frequency $f_k$) may be expressed as:

$$\underline{\hat{H}}(k) = \underline{U}(k) \underline{\Lambda}(k) \underline{V}^H(k), \qquad \text{Eq (1)}$$

where $\underline{U}(k)$ is an $N_R \times N_R$ unitary matrix (i.e., $\underline{U}^H \underline{U} = \underline{I}$, where $\underline{I}$ is the identity matrix with ones along the diagonal and zeros everywhere else);

$\underline{\Lambda}(k)$ is an $N_R \times N_T$ diagonal matrix of singular values of $\underline{\hat{H}}(k)$; and $\underline{V}(k)$ is an $N_T \times N_T$ unitary matrix.

The diagonal matrix $\underline{\Lambda}(k)$ contains non-negative real values along the diagonal (i.e., $\underline{\Lambda}(k)$=diag ($\lambda_1(k), \lambda_2(k), \ldots, \lambda_{N_T}(k)$)) and zeros elsewhere. The $\lambda_i(k)$, for i=(1, 2, ..., $N_T$), are referred to as the singular values of the matrix $\underline{\hat{H}}(k)$. The singular value decomposition is a matrix operation known in the art and described in various references. One such reference is a book by Gilbert Strang entitled "Linear Algebra and Its Applications," Second Edition, Academic Press, 1980, which is incorporated herein by reference.

The result of the singular value decomposition is three sets of $N_F$ matrices, $\underline{U}$, $\underline{\Lambda}$, and $\underline{V}^H$, where $\underline{U}$=[$\underline{U}(0) \ldots \underline{U}(k) \ldots \underline{U}(N_F-1)$], and so on. For each value of k, $\underline{U}(k)$ is the $N_R \times N_R$ unitary matrix of left eigen-vectors of $\underline{\hat{H}}(k)$, $\underline{V}(k)$ is the $N_T \times N_T$ unitary matrix of right eigen-vectors of $\underline{\hat{H}}(k)$, and $\underline{\Lambda}(k)$ is the $N_R \times N_T$ diagonal matrix of singular values of $\underline{\hat{H}}(k)$.

In another embodiment for performing channel eigen-decomposition, unit 224 first obtains a square matrix $\underline{R}(k)$ as $\underline{R}(k) = \underline{\hat{H}}(k) \underline{\hat{H}}(k)$. The eigenvalues of the square matrix $\underline{R}(k)$ would then be the squares of the singular values of the matrix $\hat{\underline{H}}(k)$, and the eigen-vectors of $\underline{R}(k)$ would be the right eigen-vectors of $\hat{\underline{H}}(k)$, or $\underline{V}(k)$. The decomposition of $\underline{R}(k)$ to obtain the eigenvalues and eigen-vectors is known in the art and not described herein. Similarly, another square matrix $\underline{R}'(k)$ may be obtained as $\underline{R}'(k) = \hat{\underline{H}}(k)\hat{\underline{H}}^H(k)$. The eigenvalues of this square matrix $\underline{R}'(k)$ would also be the squares of the singular values of $\hat{\underline{H}}(k)$, and the eigen-vectors of $\underline{R}'(k)$ would be the left eigen-vectors of $\hat{\underline{H}}(k)$, or $\underline{U}(k)$.

The channel eigen-decomposition is used to decompose the MIMO channel into its eigenmodes, at frequency $f_k$, for each value of k where $k=(0, 1, \ldots, N_F-1)$. The rank $r(k)$ of $\hat{\underline{H}}(k)$ corresponds to the number of eigenmodes for the MIMO channel at frequency $f_k$, which corresponds to the number of independent channels (i.e., the number of spatial subchannels) available in frequency bin k.

As described in further detail below, the columns of $\underline{V}(k)$ are the steering vectors associated with frequency $f_k$ to be used at the transmitter for the elements of the modulation symbol vectors, $\underline{s}(n)$. Correspondingly, the columns of $\underline{U}(k)$ are the steering vectors associated with frequency $f_k$ to be used at the receiver for the elements of the received symbol vectors, $\underline{r}(n)$. The matrices $\underline{U}(k)$ and $\underline{V}(k)$, for $k=(0, 1, \ldots, N_F-1)$, are used to orthogonalize the symbol streams transmitted on the eigenmodes at each frequency $f_k$. When these matrices are used to precondition the modulation symbol streams at the transmitter and to condition the received symbol streams at the receiver, either in the frequency domain or the time domain, the result is the overall orthogonalization of the symbol streams. This then allows for separate coding/modulation per eigenmode (as opposed to per bin), which can greatly simplify the processing at the transmitter and receiver.

The elements along the diagonal of $\underline{\Lambda}(k)$ are $\lambda_{ii}(k)$, for $i = \{1, 2, \ldots, r(k)\}$, where $r(k)$ is the rank of $\hat{\underline{H}}(k)$. The columns of $\underline{U}(k)$ and $\underline{V}(k)$, $\underline{u}_i(k)$ and $\underline{v}_i(k)$, respectively, are solutions to the eigen equation, which may be expressed as:

$$\hat{\underline{H}}(k)\underline{v}_i(k) = \lambda_{ii}\underline{u}_i(k). \quad \text{Eq (2)}$$

The three sets of matrices, $\underline{U}(k)$, $\underline{\Lambda}(k)$, and $\underline{V}(k)$, for $k=(0, 1, \ldots, N_F-1)$, may be provided in two forms—a "sorted" form and a "random-ordered" form. In the sorted form, the diagonal elements of each matrix $\underline{\Lambda}(k)$ are sorted in decreasing order so that $\lambda_{11}(k) \geq \lambda_{22}(k) \geq \ldots \geq \lambda_{rr}(k)$, and their eigen-vectors are arranged in corresponding order in $\underline{U}(k)$ and $\underline{V}(k)$. The sorted form is indicated by the subscript s, i.e., $\underline{U}_s(k)$, $\underline{\Lambda}_s(k)$, and $\underline{V}_s(k)$, for $k=(0, 1, \ldots, N_F-1)$.

In the random-ordered form, the ordering of the singular values and eigen-vectors may be random and further independent of frequency. The random form is indicated by the subscript r. The particular form selected for use, sorted or random-ordered, influences the selection of the eigenmodes for use for data transmission and the coding and modulation scheme to be used for each selected eigenmode.

A weight computation unit 230 receives the set of diagonal matrices, $\underline{\Lambda}$, which contains a set of singular values (i.e., $\lambda_{11}(k), \lambda_{22}(k), \ldots, \lambda_{rr}(k)$) for each frequency bin. Weight computation unit 230 then derives a set of weighting matrices, $\underline{W}$, where $\underline{W} = [\underline{W}(0) \ldots \underline{W}(k) \ldots \underline{W}(N_F-1)]$. The weighting matrices are used to scale the modulation symbol vectors, $\underline{s}(n)$, in either the time or frequency domain, as described below.

Weight computation unit 230 includes a channel inversion unit 232 and (optionally) a water-pouring analysis unit 234. Channel inversion unit 232 derives a set of weights, $\underline{w}_{ii}$, for each eigenmode, which is used to combat the frequency selective fading on the eigenmode. Water-pouring analysis unit 234 derives a set of scaling values, $\underline{b}$, for the eigenmodes of the MIMO channel. These scaling values are indicative of the transmit powers allocated to the eigenmodes. Channel inversion and water-pouring are described in further detail below.

Channel Inversion

Figure 3A:
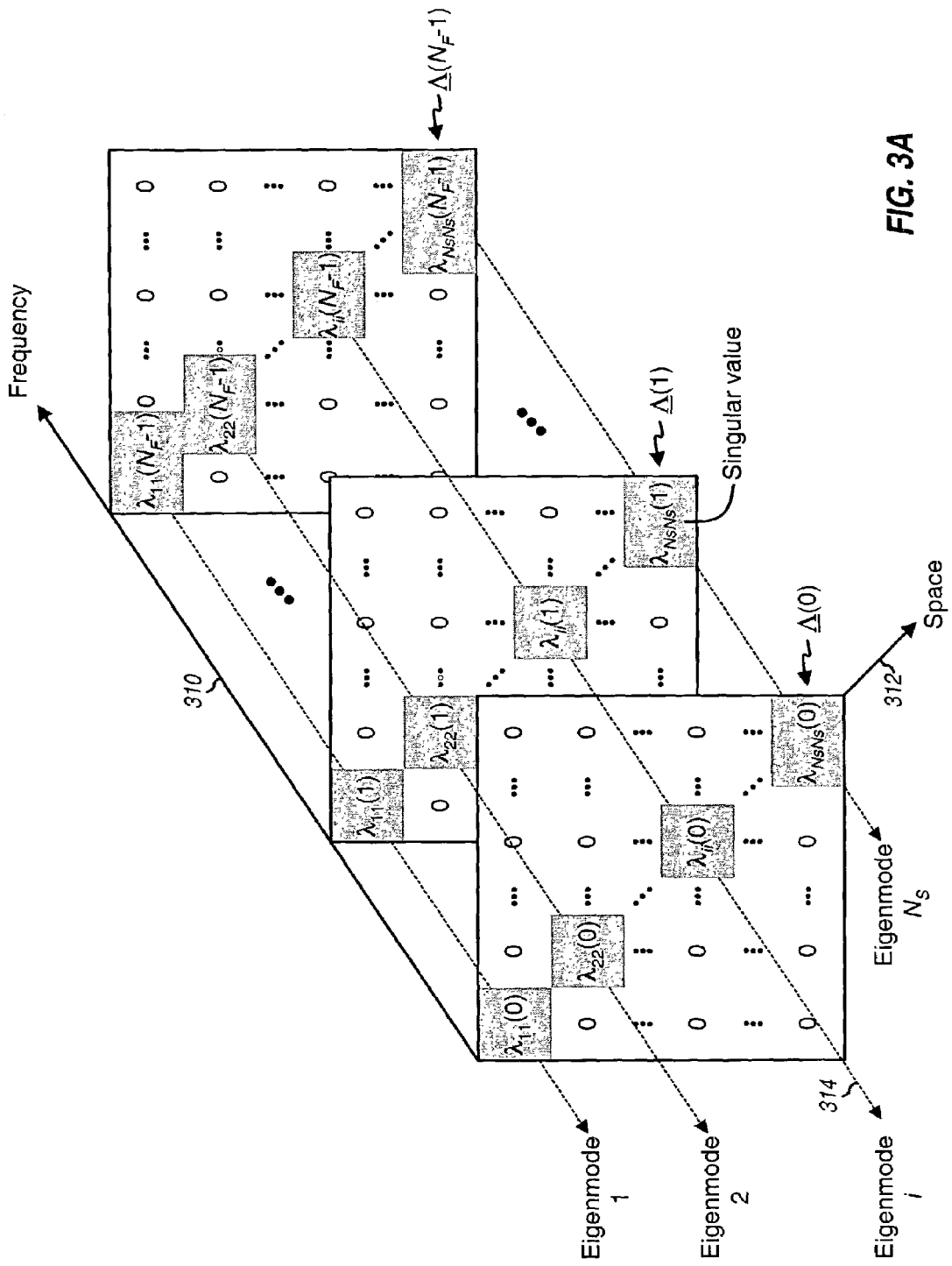
FIGS. 3A and 3B are diagrams that graphically illustrate the derivation of the weights used to invert the frequency response of each eigenmode of a MIMO channel.

FIG. 3A is a diagram that graphically illustrates the derivation of the set of weights, $\underline{w}_{ii}$, used to invert the frequency response of each eigenmode. The set of diagonal matrices, $\underline{\Lambda}(k)$ for $k=(0, 1, \ldots, N_F-1)$, is shown arranged in order along an axis 310 that represents the frequency dimension. The singular values, $\lambda_{ii}(k)$ for $i=(1, 2, \ldots, N_S)$, of each matrix $\underline{\Lambda}(k)$ are located along the diagonal of the matrix. Axis 312 may thus be viewed as representing the spatial dimension. Each eigenmode of the MIMO channel is associated with a set of elements, $\{\lambda_{ii}(k)\}$ for $k=(0, 1, \ldots, N_F-1)$, that is indicative of the frequency response of that eigenmode. The set of elements $\{\lambda_{ii}(k)\}$ for each eigenmode is shown by the shaded boxes along a dashed line 314. For each eigenmode that experiences frequency selective fading, the elements $\{\lambda_{ii}(k)\}$ for the eigenmode may be different for different values of k.

Since frequency selective fading causes ISI, the deleterious effects of ISI may be mitigated by "inverting" each eigenmode such that it appears flat in frequency at the receiver. The channel inversion may be achieved by deriving a set of weights, $\{w_{ii}(k)\}$ for $k=(0, 1, \ldots, N_F-1)$, for each eigenmode such that the product of the weights and the corresponding eigenvalues (i.e., the squares of the diagonal elements) are approximately constant for all values of k, which may be expressed as $w_{ii}(k) \cdot \lambda_{ii}^2(k) = a_i$, for $k=(0, 1, \ldots, N_F-1)$.

For eigenmode i, the set of weights for the $N_F$ frequency bins, $\underline{w}_{ii} = [w_{ii}(0) \ldots w_{ii}(k) \ldots w_{ii}(N_F-1)]^T$, used to invert the channel may be derived as:

$$w_{ii}(k) = \frac{a_i}{\lambda_{ii}^2(k)}, \text{ for } k = (0, 1, \ldots, N_F - 1), \quad \text{Eq (3)}$$

where $a_i$ is a normalization factor that may be expressed as:

$$a_i = \frac{\sum_{k=0}^{N_F-1} \lambda_{ii}^2(k)}{\sum_{k=0}^{N_F-1} \frac{1}{\lambda_{ii}^2(k)}}. \quad \text{Eq (4)}$$

As shown in equation (4), a normalization factor $a_i$ is determined for each eigenmode based on the set of eigenvalues (i.e., the squared singular values), $\{\lambda_{ii}^2, (k)\}$ for $k=(0, 1, \ldots, N_F-1)$, associated with that eigenmode. The normalization factor $a_i$ is defined such that $$\sum_{k=0}^{N_F-1} w_{ii}(k) = \sum_{k=0}^{N_F-1} \lambda_{ii}^2(k).$$

Figure 3B:
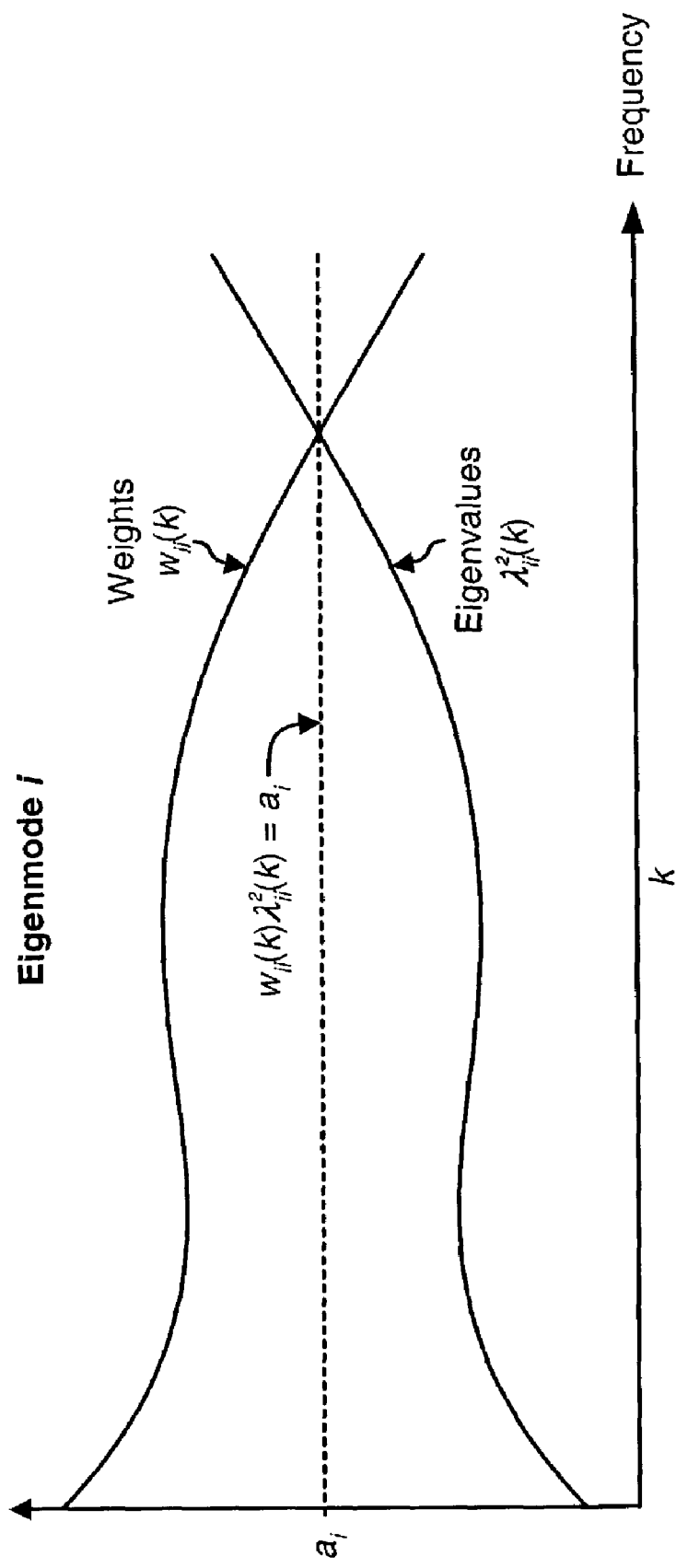

FIG. 3B is a diagram that graphically illustrates the relationship between the set of weights for a given eigenmode and the set of eigenvalues for that eigenmode. For eigenmode i, the weight $w_{ii}(k)$ for each frequency bin is inversely related to the eigenvalue $\lambda_{ii}^2(k)$ for that bin, as shown in equation (3). To flatten the spatial subchannel and minimize or reduce ISI, it is undesirable to selectively eliminate transmit power on any frequency bin. The set of $N_F$ weights for each eigenmode is used to scale the modulation symbols, $\underline{s}(n)$, in the frequency or time domain, prior to transmission on the eigenmode.

For the sorted order form, the singular values $\lambda_{ii}(k)$, for $i=(1, 2, \ldots, N_S)$, for each matrix $\underline{\Lambda}(k)$ are sorted such that the diagonal elements of $\underline{\Lambda}(k)$ with smaller indices are generally larger. Eigenmode 0 (which is often referred to as the principle eigenmode) would then be associated with the largest singular value in each of the $N_F$ diagonal matrices, $\underline{\Lambda}(k)$, eigenmode 1 would then be associated with the second largest singular value in each of the $N_F$ diagonal matrices, and so on. Thus, even though the channel inversion is performed over all $N_F$ frequency bins for each eigenmode, the eigenmodes with lower indices are not likely to have too many bad bins (if any). Thus, at least for eigenmodes with lower indices, excessive transmit power is not used for bad bins.

The channel inversion may be performed in various manners to invert the MIMO channel, and this is within the scope of the invention. In one embodiment, the channel inversion is performed for each eigenmode selected for use. In another embodiment, the channel inversion may be performed for some eigenmodes but not others. For example, the channel inversion may be performed for each eigenmode determined to induce excessive ISI. The channel inversion may also be dynamically performed for some or all eigenmodes selected for use, for example, when the MIMO channel is determined to be frequency selective (e.g., based on some defined criteria).

Channel inversion is described in further detail in U.S. patent application Ser. No. 09/860,274, filed May 17, 2001, U.S. patent application Ser. No. 09/881,610, filed Jun. 14, 2001, and U.S. patent application Ser. No. 09/892,379, filed Jun. 26, 2001, all three entitled "Method and Apparatus for Processing Data for Transmission in a Multi-Channel Communication System Using Selective Channel Inversion," assigned to the assignee of the present application and incorporated herein by reference.

Water-Pouring

In an embodiment, water-pouring analysis is performed (if at all) across the spatial dimension such that more transmit power is allocated to eigenmodes with better transmission capabilities. The water-pouring power allocation is analogous to pouring a fixed amount of water into a vessel with an irregular bottom, where each eigenmode corresponds to a point on the bottom of the vessel, and the elevation of the bottom at any given point corresponds to the inverse of the SNR associated with that eigenmode. A low elevation thus corresponds to a high SNR and, conversely, a high elevation corresponds to a low SNR. The total available transmit power, $P_{total}$, is then "poured" into the vessel such that the lower points in the vessel (i.e., those with higher SNRs) are filled first, and the higher points (i.e., those with lower SNRs) are filled later. A constant $P_{set}$ is indicative of the water surface level for the vessel after all of the total available transmit power has been poured. This constant may be estimated initially based on various system parameters. The power allocation is dependent on the total available transmit power and the depth of the vessel over the bottom surface. The points with elevations above the water surface level are not filled (i.e., eigenmodes with SNRs below a particular value are not used for data transmission).

In an embodiment, the water-pouring is not performed across the frequency dimension because this tends to exaggerate the frequency selectivity of the eigenmodes created by the channel eigenmode decomposition described above. The water-pouring may be performed such that all eigenmodes are used for data transmission, or only a subset of the eigenmodes is used (with bad eigenmodes being discarded). It can be shown that water-pouring across the eigenmodes, when used in conjunction with the channel inversion with the singular values sorted in descending order, can provide near-optimum performance while mitigating the need for equalization at the receiver.

The water-pouring may be performed by water-pouring analysis unit 234 as follows. Initially, the total power in each eigenmode is determined as:

$$P_{i,\lambda} = \sum_{k=0}^{N_F-1} \lambda_{ii}^2(k). \quad \text{Eq (5)}$$

The SNR for each eigenmode may then be determined as:

$$SNR_i = \frac{P_{i,\lambda}}{\sigma^2}, \quad \text{Eq (6)}$$

where $\sigma^2$ is the received noise variance, which may also be denoted as the received noise power $N_0$. The received noise power corresponds to the noise power on the recovered symbols at the receiver, and is a parameter that may be provided by the receiver to the transmitter as part of the reported CSI.

The transmit power, $P_i$, to be allocated to each eigenmode may then be determined as:

$$P_i = \max\left[\left(P_{set} - \frac{1}{SNR_i}\right), 0\right], \text{ and} \quad \text{Eq (7a)}$$

$$P_{total} \geq \sum_{i=1}^{N_S} P_i, \quad \text{Eq (7b)}$$

where $P_{set}$ is a constant that may be derived from various system parameters, and $P_{total}$ is the total transmit power available for allocation to the eigenmodes.

As shown in equation (7a), each eigenmode of sufficient quality is allocated transmit power of $$\left(P_{set} - \frac{1}{SNR_i}\right).$$

Thus, eigenmodes that achieve better SNRs are allocated more transmit powers. The constant $P_{set}$ determines the amounts of transmit power to allocate to the better eigenmodes. This then indirectly determines which eigenmodes get selected for use since the total available transmit power is limited and the power allocation is constrained by equation (7b).

Water-pouring analysis unit 234 thus receives the set of diagonal matrices, $\underline{\underline{\Lambda}}$, and the received noise power, $\sigma^2$. The matrices $\underline{\underline{\Lambda}}$ are then used in conjunction with the received noise power to derive a vector of scaling values, $\underline{b} = [b_0 \ldots$ $b_i \ldots b_{N_S}]^T$, where $b_i = P_i$ for $i = (1, 2, \ldots, N_S)$. The $P_i$ are the solutions to the water-pouring equations (7a) and (7b). The scaling values in $\underline{b}$ are indicative of the transmit powers allocated to the $N_S$ eigenmodes, where zero or more eigenmodes may be allocated no transmit power.

Figure 4:
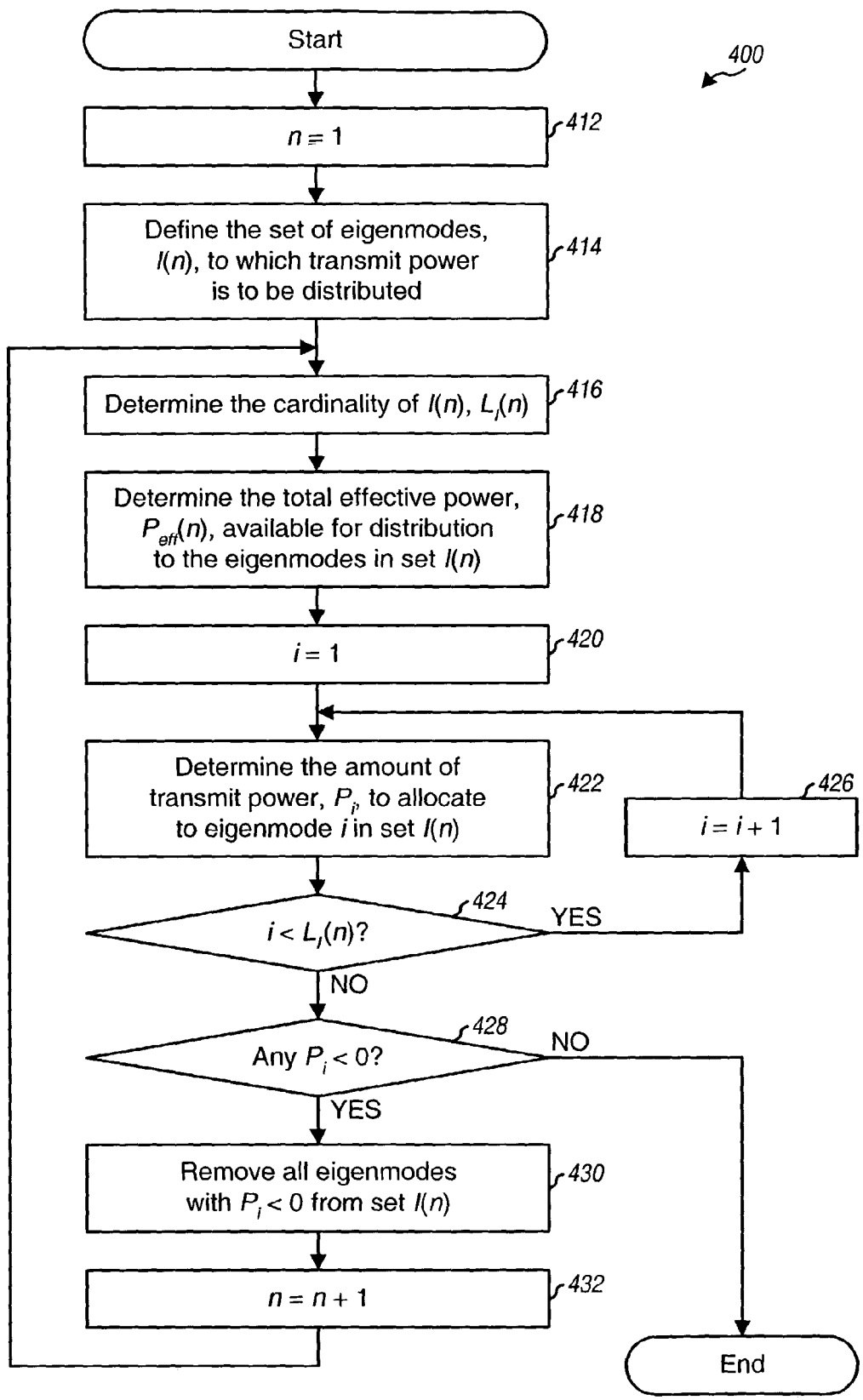
FIG. 4 is a flow diagram of a process for allocating the total available transmit power to the eigenmodes of the MIMO channel.

FIG. 4 is a flow diagram of an embodiment of a process 400 for allocating the total available transmit power to a set of eigenmodes. Process 400, which is one specific water-pouring implementation, determines the transmit powers, $P_i$, for $i \in I$, to be allocated to the eigenmodes in set I, given the total transmit power, $P_{total}$, available at the transmitter, the set of eigenmode total powers, $P_{i,\lambda}$, and the received noise power, $\sigma^2$.

Initially, the variable n used to denote the iteration number is set to one (i.e., n=1) (step 412). For the first iteration, set I(n) is defined to include all of the eigenmodes for the MIMO channel, or $I(n) = \{1, 2, \ldots, N_S\}$ (step 414). The cardinality (or length) of set I(n) for the current iteration n is then determined as $L_I(n) = |I(n)|$, which is $L_I(n) = N_S$ for the first iteration (step 416).

The total effective power, $P_{eff}(n)$, to be distributed across the eigenmodes in set I(n) is next determined (step 418). The total effective power is defined to be equal to the total available transmit power, $P_{total}$, plus the sum of the inverse SNRs for the eigenmodes in set I(n). This may be expressed as:

$$P_{eff}(n) = P_{total} + \sum_{i \in I(n)} \frac{\sigma^2}{P_{i,\lambda}}. \qquad \text{Eq (8)}$$

The total available transmit power is then allocated to the eigenmodes in set I(n). The index i used to iterate through the eigenmodes in set I(n) is initialized to one (i.e., i=1) (step 420). The amount of transmit power to allocate to eigenmode i is then determined (step 422) based on the following:

$$P_i(n) = \frac{P_{eff}(n)}{L_I(n)} - \frac{\sigma^2}{P_{i,\lambda}}. \qquad \text{Eq (9)}$$

Each eigenmode in set I(n) is allocated transmit power, $P_i$, in step 422. Steps 424 and 426 are part of a loop to allocate transmit power to each of the eigenmodes in set I(n).

Figure 5A:
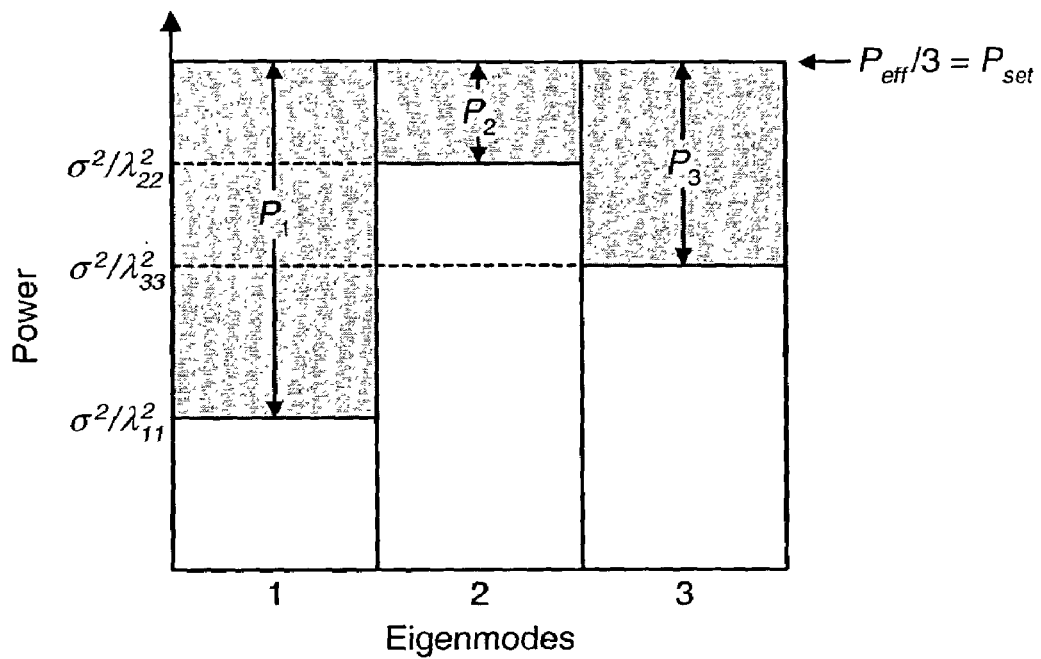
FIGS. 5A and 5B are diagrams that graphically illustrate the allocation of the total transmit power to three eigenmodes in an example MIMO system.

FIG. 5A graphically illustrates the total effective power, $P_{eff}$, for an example MIMO system with three eigenmodes. Each eigenmode has an inverse SNR equal to $\sigma^2/\lambda_{ii}^2$, for $i = \{1, 2, 3\}$, which assumes a normalized transmit power of 1.0. The total transmit power available at the transmitter is $P_{total} = P_1 + P_2 + P_3$, and is represented by the shaded area in FIG. 5A. The total effective power is represented by the area in the shaded and unshaded regions in FIG. 5A.

For water-pouring, although the bottom of the vessel has an irregular surface, the water level at the top remains constant across the vessel. Likewise and as shown in FIG. 5A, after the total available transmit power, $P_{total}$, has been distributed to the eigenmodes, the final power level is constant across all eigenmodes. This final power level is determined by dividing $P_{eff}(n)$ by the number of eigenmodes in set I(n), $L_I(n)$. The amount of power allocated to eigenmode i is then determined by subtracting the inverse SNR of that eigenmode, $\sigma^2/\lambda_{ii}^2$, from the final power level, $P_{eff}(n)/L_I(n)$, as given by equation (9) and shown in FIG. 5A.

Figure 5B:
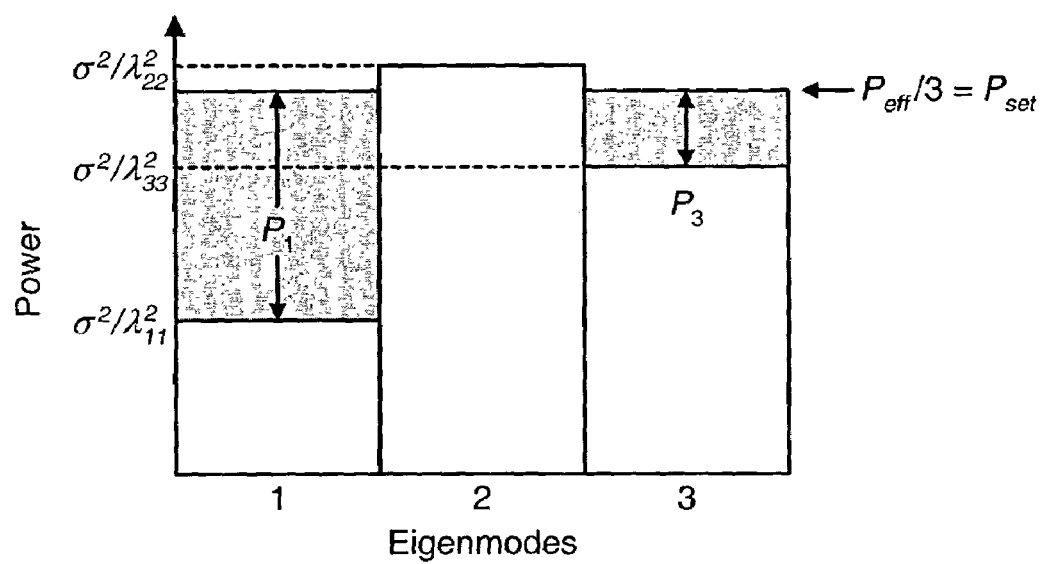

FIG. 5B shows a situation whereby the water-pouring power allocation results in an eigenmode receiving negative power. This occurs when the inverse SNR of the eigenmode is above the final power level, which is expressed by the condition $(P_{eff}(n)/L_I(n)) < (\sigma^2/\lambda_{ii}^2)$.

Referring back to FIG. 4, at the end of the power allocation, a determination is made whether or not any eigenmode has been allocated negative power (i.e., $P_i < 0$) (step 428). If the answer is yes, then the process continues by removing from set I(n) all eigenmodes that have been allocated negative powers (step 430). The index n is incremented by one (i.e., n=n+1) (step 432). The process then returns to step 416 to allocate the total available transmit power among the remaining eigenmodes in set I(n). The process continues until all eigenmodes in set I(n) have been allocated positive transmit powers, as determined in step 428. The eigenmodes not in set I(n) are allocated zero power.

Water-pouring is also described by Robert G. Gallager, in "Information Theory and Reliable Communication," John Wiley and Sons, 1968, which is incorporated herein by reference. A specific algorithm for performing the basic water-pouring process for a MIMO-OFDM system is described in U.S. patent application Ser. No. 09/978,337, entitled "Method and Apparatus for Determining Power Allocation in a MIMO Communication System," filed Oct. 15, 2001. Water-pouring is also described in further detail in U.S. patent application Ser. No. 10/056,275, entitled "Reallocation of Excess Power for Full Channel-State Information (CSI) Multiple-Input, Multiple-Output (MIMO) Systems," filed Jan. 23, 2002. These applications are assigned to the assignee of the present application and incorporated herein by reference.

If water-pouring is performed to allocate the total available transmit power to the eigenmodes, then water-pouring analysis unit 234 provides a set of $N_S$ scaling values, $\underline{b} = \{b_0 \ldots b_i \ldots b_{N_S}\}$, for the $N_S$ eigenmodes. Each scaling value is for a respective eigenmode and is used to scale the set of weights determined for that eigenmode.

For eigenmode i, a set of weights, $\underline{\hat{w}}_{ii}[\hat{w}_{ii}(0) \ldots \hat{w}_{ii}(k) \ldots \hat{w}_{ii}(N_F - 1)]^T$, used to invert the channel and scale the transmit power of the eigenmode may be derived as:

$$\hat{w}_{ii}(k) = \frac{a_i b_i}{\lambda_{ii}^2(k)}, \text{ for } k = (0, 1, \ldots, N_F - 1), \qquad \text{Eq (10)}$$

where the normalization factor, $a_i$, and the scaling value, $b_i$, are derived as described above.

Weight computation unit 230 provides the set of weighting matrices, $\underline{W}$, which may be obtained using the weights $w_{ii}(k)$ or $\hat{w}_{ii}(k)$. Each weighting matrix, $\underline{W}(k)$, is a diagonal matrix whose diagonal elements are composed of the weights derived above. In particular, if only channel inversion is performed, then each weighting matrix, $\underline{W}(k)$, for $k = (0, 1, \ldots, N_F - 1)$, is defined as:

$$\underline{W}(k) = \text{diag}(w_{11}(k), w_{22}(k), \ldots, w_{N_S N_S}(k)), \qquad \text{Eq (11a)}$$

where $w_{ii}(k)$ is derived as shown in equation (3). And if both channel inversion and water-pouring are performed, then each weighting matrix, $\underline{W}(k)$, for $k = (0, 1, \ldots, N_F - 1)$, is defined as:

$$\underline{W}(k) = \text{diag}(\hat{w}_{11}(k), \hat{w}_{22}(k), \ldots, \hat{w}_{N_S N_S}(k)), \qquad \text{Eq (11b)}$$

where $\hat{w}_{ii}(k)$ is derived as shown in equation (10).

Referring back to FIG. 2, a scaler/IFFT 236 receives (1) the set of unitary matrices, $\underline{V}$, which are the matrices of right eigen-vectors of $\underline{\hat{H}}$, and (2) the set of weighting matrices, $\underline{W}$, for all $N_F$ frequency bins. Scaler/IFFT 236 then derives a spatio-temporal pulse-shaping matrix, $\underline{P}_{tx}(n)$, for the transmitter based on the received matrices. Initially, the square root of each weighting matrix, $\underline{W}(k)$, is computed to obtain a corresponding matrix, $\sqrt{\underline{W}(k)}$, whose elements are the square roots of the elements of $\underline{W}(k)$. The elements of the weighting matrices, $\underline{W}(k)$ for $k=(0, 1, \ldots, N_F-1)$, are related to the power of the eigenmodes. The square root then transforms the power to the equivalent signal scaling. For each frequency bin k, the product of the square-root weighting matrix, $\sqrt{\underline{W}(k)}$, and the corresponding unitary matrix, $\underline{V}(k)$, is then computed to provide a product matrix, $\underline{V}(k)\sqrt{\underline{W}(k)}$. The set of product matrices, $\underline{V}(k)\sqrt{\underline{W}(k)}$ for $k=(0, 1, \ldots, N_F-1)$, which is also denoted as $\underline{\underline{V}}\sqrt{\underline{\underline{W}}}$, defines the optimal or near-optimal spatio-spectral shaping to be applied to the modulation symbol vectors, $\underline{s}(n)$.

An inverse FFT of $\underline{\underline{V}}\sqrt{\underline{\underline{W}}}$ is then computed to derive the spatio-temporal pulse-shaping matrix, $\underline{P}_{tx}(n)$, for the transmitter, which may be expressed as:

$$\underline{P}_{tx}(n)=\text{IFFT}[\underline{\underline{V}}\sqrt{\underline{\underline{W}}}]. \quad \text{Eq (12)}$$

The pulse-shaping matrix, $\underline{P}_{tx}(n)$, is an $N_T \times N_T$ matrix. Each element of $\underline{P}_{tx}(n)$ is a set of $N_F$ time-domain values, which is obtained by the inverse FFT of a set of values for the corresponding element of the product matrices, $\underline{\underline{V}}\sqrt{\underline{\underline{W}}}$. Each column of $\underline{P}_{tx}(n)$ is a steering vector for a corresponding element of $\underline{s}(n)$.

A convolver 240 receives and preconditions the modulation symbol vectors, $\underline{s}(n)$, with the pulse-shaping matrix, $\underline{P}_{tx}(n)$, to provide the transmitted symbol vectors, $\underline{x}(n)$. In the time domain, the preconditioning is a convolution operation, and the convolution of $\underline{s}(n)$ with $\underline{P}_{tx}(n)$ may be expressed as:

$$x(n) = \sum_l \underline{P}_{tx}(l)\underline{s}(n-l). \quad \text{Eq (13)}$$

The matrix convolution shown in equation (13) may be performed as follows. To derive the i-th element of the vector $\underline{x}(n)$ for time n, $x_i(n)$, the inner product of the i-th row of the matrix $\underline{P}_{tx}(l)$ with the vector $\underline{s}(n-l)$ is formed for a number of delay indices (e.g., $0 \leq l \leq (N_F-1)$), and the results are accumulated to derive the element $x_i(n)$. The preconditioned symbol streams transmitted on each transmit antenna (i.e., each element of $\underline{x}(n)$ or $x_i(n)$) is thus formed as a weighted combination of the $N_R$ modulation symbol streams, with the weighting determined by the appropriate column of the matrix $\underline{P}_{tx}(n)$. The process is repeated such that each element of $\underline{x}(n)$ is obtained from a respective column of the matrix $\underline{P}_{tx}(n)$ and the vector $\underline{s}(n)$.

Each element of $\underline{x}(n)$ corresponds to a sequence of preconditioned symbols to be transmitted over a respective transmit antenna. The $N_T$ preconditioned symbol sequences collectively form a sequence of vectors, which are also referred to as the transmitted symbol vectors, $\underline{x}(n)$, with each such vector including up to $N_T$ preconditioned symbols to be transmitted from up to $N_T$ transmit antennas for the n-th symbol period. The $N_T$ preconditioned symbol sequences are provided to transmitters 122a through 122t and processed to derive $N_T$ modulated signals, which are then transmitted from antennas 124a through 124t, respectively.

The embodiment shown in FIG. 2 performs time-domain beam-steering of the modulation symbol vectors, $\underline{s}(n)$. The beam-steering may also be performed in the frequency domain. This can be done using techniques, such as the overlap-add method, which are well-known in the digital signal processing field, for implementing finite-duration impulse response (FIR) filters in the frequency domain. In this case, the sequences that make up the elements of the matrix $\underline{P}_{tx}(n)$ for $n=(0, 1, \ldots, N_F-1)$ are each padded with $N_O-N_F$ zeros, resulting in a matrix of zero-padded sequences, $\underline{q}_{tx}(n)$, for $n=(0, 1, \ldots, N_O-1)$. An $N_O$-point fast Fourier transform (FFT) is then computed for each zero-padded sequence in the matrix $\underline{q}_{tx}(n)$, resulting in a matrix $\underline{Q}_{tx}(k)$ for $k=(0, 1, \ldots, N_O-1)$.

Also, the sequences of modulation symbols that make up the elements of $\underline{s}(n)$ are each broken up into subsequences of length $N_{SS}=N_O-N_F+1$. Each subsequence is then padded with $N_F-1$ zeros to provide a corresponding vector of length $N_O$. The sequences of $\underline{s}(n)$ are thus processed to provide sequences of vectors of length $N_O$, $\tilde{\underline{s}}_l(n)$, where the subscript l is the index for the vectors that correspond to the zero-padded subsequences. An $N_O$-point fast Fourier transform is then computed for each of the zero-padded subsequences, resulting in a sequence of frequency-domain vectors, $\tilde{\underline{S}}_l(k)$, for different values of l. Each vector $\tilde{\underline{S}}_l(k)$, for a given l, includes a set of frequency-domain vectors of length $N_O$ (i.e., for $k=(0, 1, \ldots, N_O-1)$). The matrix $\underline{Q}_{tx}(k)$ is then multiplied with the vector $\tilde{\underline{S}}_l(k)$, for each value of l, where the pre-multiplication is performed for each value of k, i.e., for $k=(0, 1, \ldots, N_O-1)$. The inverse FFTs are then computed for the matrix-vector product $\underline{Q}_{tx}(k)\tilde{\underline{S}}_l(k)$ to provide a set of time-domain subsequences of length $N_O$. The resulting subsequences are then reassembled, according to the overlap-add method, or similar means, as is well-known in the art, to form the desired output sequences.

Figure 6:
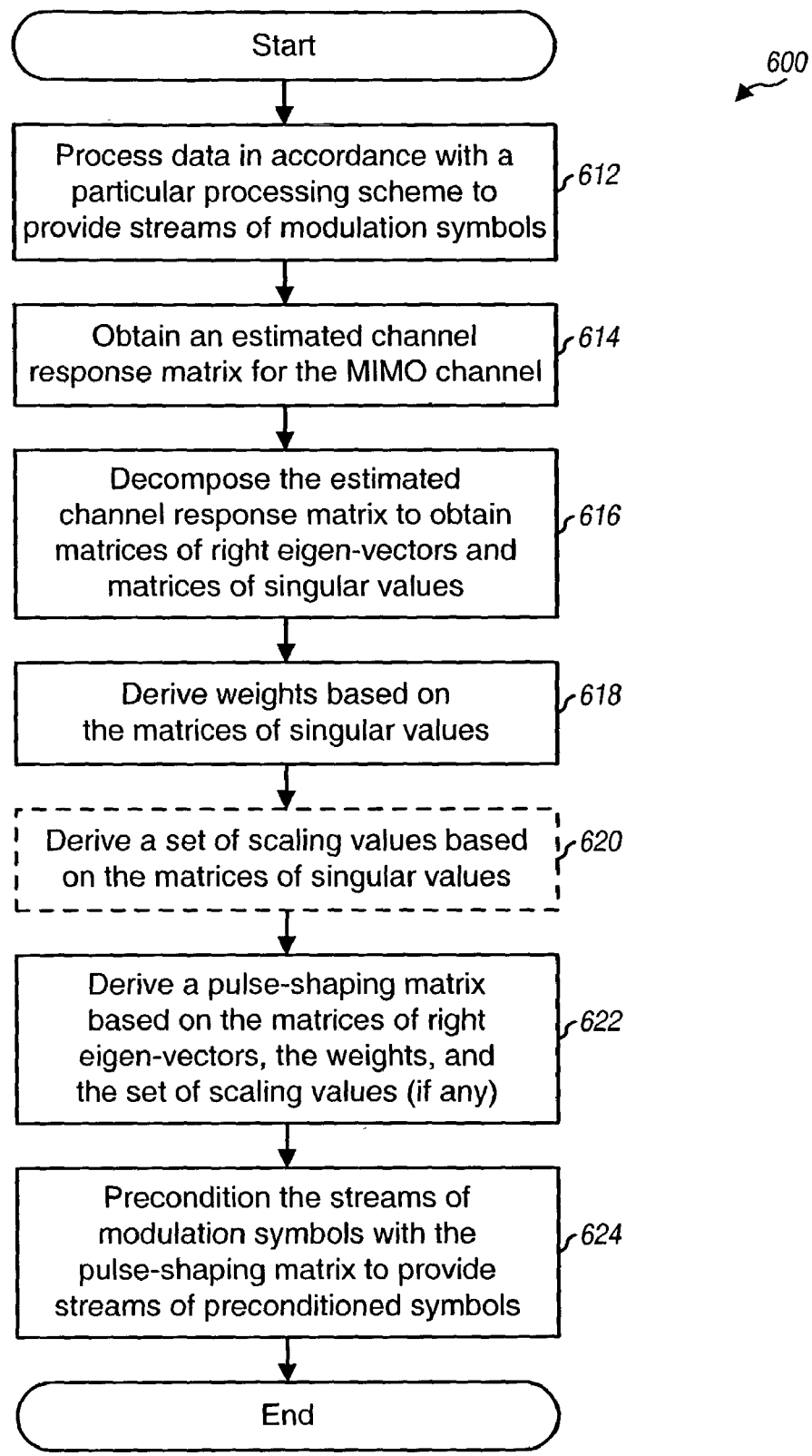
FIG. 6 is a flow diagram of an embodiment of the signal processing at the transmitter unit.

FIG. 6 is a flow diagram of an embodiment of a process 600 that may be performed at the transmitter unit to implement the various transmit processing techniques described herein. Initially, data to be transmitted (i.e., the information bits) is processed in accordance with a particular processing scheme to provide a number of streams of modulation symbols (step 612). As noted above, the processing scheme may include one or more coding schemes and one or more modulation schemes (e.g., a separate coding and modulation scheme for each modulation symbol stream).

An estimated channel response matrix for the MIMO channel is then obtained (step 614). This matrix may be the estimated channel impulse response matrix, $\underline{\hat{\mathcal{H}}}$, or the estimated channel frequency response matrix, $\underline{\hat{H}}$, which may be provided to the transmitter from the receiver. The estimated channel response matrix is then decomposed (e.g., using channel eigen-decomposition) to obtain a set of matrices of right eigen-vectors, $\underline{\underline{V}}$, and a set of matrices of singular values, $\underline{\underline{\Lambda}}$ (step 616).

A number of sets of weights, $\underline{w}_{ii}$, are then derived based on the matrices of singular values (step 618). One set of weight may be derived for each eigenmode used for data transmission. These weights are used to reduce or minimize intersymbol interference at the receiver by inverting the frequency response of each eigenmode selected for use.

A set of scaling values, $\underline{b}$, may also be derived based on the matrices of singular values (step 620). Step 620 is optional, as indicated by the dashed box for step 620 in FIG. 6. The scaling values may be derived using water-pouring analysis and are used to adjust the transmit powers of the selected eigenmodes.

pulse-shaping matrix, $\underline{P}_{tx}(n)$, is then derived based on the matrices of right eigen-vectors, $\underline{\underline{V}}$, the sets of weights, $\underline{w}_{ii}$, and (if available) the set of scaling values, $\underline{b}$ (step 622). The streams of modulation symbols are then preconditioned (in either the time domain or frequency domain) based on the pulse-shaping matrix to provide a number of streams of preconditioned symbols, $\underline{x}(n)$, to be transmitted over the MIMO channel (step 624).

Time-domain transmit processing with channel eigenmode decomposition and water-pouring is described in further detail in U.S. patent application Ser. No. 10/017,038, entitled "Time-Domain Transmit and Receive Processing with Channel Eigen-mode Decomposition for MIMO Systems," filed Dec. 7, 2001, which is assigned to the assignee of the present application and incorporated herein by reference.

Figure 7:
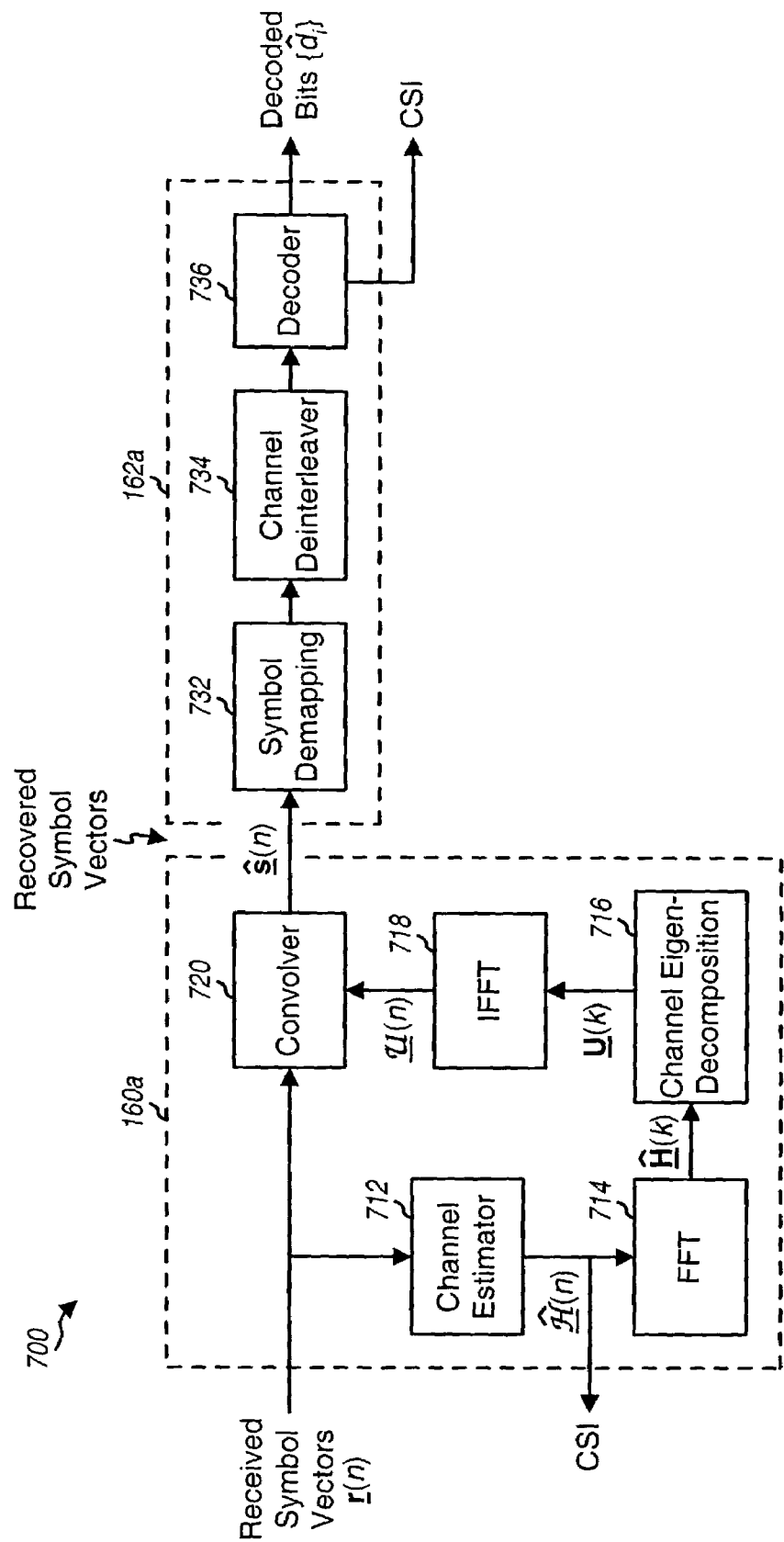
FIG. 7 is a block diagram of a receiver unit within the receiver system.

FIG. 7 is a block diagram of an embodiment of a receiver unit 700 capable of implementing various processing techniques described herein. Receiver unit 700 is an embodiment of the receiver portion of receiver system 150 in FIG. 1. Receiver unit 700 includes (1) a RX MIMO processor 160a that processes $N_R$ received symbol streams to provide $N_T$ recovered symbol streams and (2) a RX data processor 162a that demodulates, deinterleaves, and decodes the recovered symbols to provide decoded bits. RX MIMO processor 160a and RX data processor 162a are one embodiment of RX MIMO processor 160 and RX data processor 162, respectively, in FIG. 1.

Referring back to FIG. 1, the transmitted signals from $N_T$ transmit antennas are received by each of $N_R$ antennas 152a through 152r. The received signal from each antenna is routed to a respective receiver 154, which is also referred to as a front-end processor. Each receiver 154 conditions (e.g., filters, amplifies, and frequency downconverts) a respective received signal, and further digitizes the conditioned signal to provide ADC samples. Each receiver 154 may further data demodulate the ADC samples with a recovered pilot to provide a respective stream of received symbols. Receivers 154a through 154r thus provide $N_R$ received symbol streams. These streams collectively form a sequence of vectors, which are also referred to as the received symbol vectors, $\underline{r}(n)$, with each such vector including $N_R$ received symbols from the $N_R$ receivers 154 for the n-th symbol period. The received symbol vectors, $\underline{r}(n)$, are then provided to RX MIMO processor 160a.

Within RX MIMO processor 160a, a channel estimator 712 receives the vectors $\underline{r}(n)$ and derives an estimated channel impulse response matrix, $\hat{\underline{\mathcal{H}}}$, which may be sent back to the transmitter system and used in the transmit processing. An FFT 714 then performs an FFT on the estimated channel impulse response matrix, $\hat{\underline{\mathcal{H}}}$, to obtain the estimated channel frequency response matrix, $\hat{\underline{H}}$ (i.e., $\hat{\underline{H}}$=FFT[$\hat{\underline{\mathcal{H}}}$]).

A unit 716 then performs the channel eigen-decomposition of $\hat{\underline{H}}(k)$, for each frequency bin k, to obtain the corresponding matrix of left eigen-vectors, $\underline{U}(k)$. Each column of $\underline{U}$, where $\underline{\underline{U}}=[\underline{U}(0) \ldots \underline{U}(k) \ldots \underline{U}(N_F-1)]$, is a steering vector for a corresponding element of $\underline{r}(n)$, and is used to orthogonalize the received symbol streams. An IFFT 718 then performs the inverse FFT of $\underline{\underline{U}}$ to obtain a spatio-temporal pulse-shaping matrix, $\underline{\mathcal{U}}(n)$, for the receiver system.

A convolver 720 then conditions the received symbol vectors, $\underline{r}(n)$, with the conjugate transpose of the spatio-temporal pulse-shaping matrix, $\underline{\mathcal{U}}^H(n)$, to obtain the recovered symbol vectors, $\hat{\underline{s}}(n)$, which are estimates of the modulation symbol vectors, $\underline{s}(n)$. In the time domain, the conditioning is a convolution operation, which may be expressed as:

$$\hat{\underline{s}}(n) = \sum_l \underline{\mathcal{U}}^H(l)\underline{r}(n-l). \qquad \text{Eq (14)}$$

The pulse-shaping at the receiver may also be performed in the frequency domain, similar to that described above for the transmitter. In this case, the $N_R$ sequences of received symbols for the $N_R$ receive antennas, which make up the sequence of received symbol vectors, $\underline{r}(n)$, are each broken up into subsequences of $N_{SS}$ received symbols, and each subsequence is zero-padded to provide a corresponding vector of length $N_O$. The $N_R$ sequences of $\underline{r}(n)$ are thus processed to provide $N_R$ sequences of vectors of length $N_O$, $\tilde{r}_l(n)$, where the subscript l is the index for the vectors that correspond to the zero-padded subsequences. Each zero-padded subsequence is then transformed via an FFT, resulting in a sequence of frequency-domain vectors, $\underline{R}_l(k)$, for different values of l. Each vector $\underline{R}_l(k)$, for a given l, includes a set of frequency-domain vectors of length $N_O$ (i.e., for k=(0, 1, ..., $N_O$-1)).

The conjugate transpose of the spatio-temporal pulse-shaping matrix, $\hat{\underline{\mathcal{U}}}^H(n)$, is also zero-padded and transformed via an FFT to obtain a frequency-domain matrix, $\tilde{\underline{U}}^H(k)$ for k=(0, 1, ..., $N_O$-1). The vector $\underline{R}_l(k)$, for each value of l, is then pre-multiplied with the conjugate transpose matrix $\tilde{\underline{U}}^H(k)$ (where the pre-multiplication is performed for each value of k, i.e., for k=(0, 1, ..., $N_O$-1)) to obtain a corresponding frequency-domain vector $\hat{\underline{S}}_l(k)$. Each vector $\hat{\underline{S}}_l(k)$, which includes a set of frequency-domain vectors of length $N_O$, can then be transformed via an inverse FFT to provide a corresponding set of time-domain subsequences of length $N_O$. The resulting subsequences are then reassembled according to the overlap-add method, or similar means, as is well-known in the art, to obtain sequences of recovered symbols, which corresponds to the set of recovered symbol vectors, $\hat{\underline{s}}(n)$.

Thus recovered symbol vectors, $\hat{\underline{s}}(n)$, may be characterized as a convolution in the time domain, as follows:

$$\hat{\underline{s}}(n) = \sum_l \underline{\Gamma}(l)\underline{s}(n-l) + \hat{\underline{z}}(n), \qquad \text{Eq (15)}$$

where $\underline{\Gamma}(l)$ is the inverse FFT of $\hat{\underline{\Lambda}}(k)=\underline{\Lambda}(k)\sqrt{\underline{W}(k)}$; and $\hat{\underline{z}}(n)$ is the received noise as transformed by the receiver spatio-temporal pulse-shaping matrix, $\hat{\underline{\mathcal{U}}}^H(l)$.

The matrix $\underline{\Gamma}(n)$ is a diagonal matrix of eigen-pulses derived from the set of matrices $\hat{\underline{\Lambda}}$, where $\hat{\underline{\Lambda}}=[\hat{\underline{\Lambda}}(0) \ldots \hat{\underline{\Lambda}}(k) \ldots \hat{\underline{\Lambda}}(N_F-1)]$. In particular, each diagonal element of $\underline{\Gamma}(n)$ corresponds to an eigen-pulse that is obtained as the IFFT of a set of singular values, $[\hat{\lambda}_{ii}(0) \ldots \hat{\lambda}_{ii}(k) \ldots \hat{\lambda}_{ii}(N_F-1)]^T$, for a corresponding element of $\hat{\underline{\Lambda}}$.

The two forms for ordering the singular values, sorted and random-ordered, result in two different types of eigen-pulses. For the sorted form, the resulting eigen-pulse matrix, $\underline{\Gamma}_s(n)$, is a diagonal matrix of pulses that are sorted in descending order of energy content. The pulse corresponding to the first diagonal element of the eigen-pulse matrix, $\{\underline{\Gamma}_s(n)\}_{11}$, has the most energy, and the pulses corresponding to elements further down the diagonal have successively less energy. Furthermore, when the SNR is low enough that water-pouring results in some of the frequency bins having little or no energy, the energy is taken out of the smallest eigen-pulses first. Thus, at low SNRs, one or more of the eigen-pulses may have little or no energy. This has the advantage that at low SNRs, the coding and modulation are simplified through the reduction in the number of orthogonal subchannels. However, in order to approach channel capacity, the coding and modulation are performed separately for each eigen-pulse.

The random-ordered form of the singular values in the frequency domain may be used to further simplify coding and modulation (i.e., to avoid the complexity of separate coding and modulation for each element of the eigen-pulse matrix). In the random-ordered form, for each frequency bin, the ordering of the singular values is random instead of being based on their magnitude or size. This random ordering can result in approximately equal energy in all of the eigen-pulses. When the SNR is low enough to result in frequency bins with little or no energy, these bins are spread approximately evenly among the eigenmodes so that the number of eigen-pulses with non-zero energy is the same independent of SNR. At high SNRs, the random-order form has the advantage that all of the eigen-pulses have approximately equal energy, in which case separate coding and modulation for different eigenmodes are not required.

If the response of the MIMO channel is frequency selective, then the elements in the diagonal matrices, $\underline{\Lambda}(k)$, are time-dispersive. However, because of the pre-processing at the transmitter to invert the channel, the resulting recovered symbol sequences, $\hat{\underline{s}}(n)$, have little intersymbol interference, if the channel inversion is effectively performed. In that case, additional equalization would not be required at the receiver to achieve high performance.

If the channel inversion is not effective (e.g., due to an inaccurate estimated channel frequency response matrix, $\hat{\underline{\underline{H}}}$) then an equalizer may be used to equalize the recovered symbols, $\hat{\underline{s}}(n)$, prior to the demodulation and decoding. Various types of equalizer may be used to equalize the recovered symbol streams, including a minimum mean square error linear equalizer (MMSE-LE), a decision feedback equalizer (DFE), a maximum likelihood sequence estimator (MLSE), and so on.

Since the orthogonalization process at the transmitter and receiver results in decoupled (i.e., orthogonal) recovered symbol streams at the receiver, the complexity of the equalization required for the decoupled symbol streams is greatly reduced. In particular, the equalization may be achieved by parallel time-domain equalization of the independent symbol streams. The equalization may be performed as described in the aforementioned U.S. patent application Ser. No. 10/017, 038, and in U.S. patent application Ser. No. 09/993,087, entitled "Multiple-Access Multiple-Input Multiple-Output (MIMO) Communication System," filed Nov. 6, 2001, which is assigned to the assignee of the present application and incorporated herein by reference.

For the embodiment in FIG. 7, the recovered symbol vectors, $\hat{\underline{s}}(n)$, are provided to RX data processor 162a. Within processor 162a, a symbol demapping element 732 demodulates each recovered symbol in $\hat{\underline{s}}(n)$ in accordance with a demodulation scheme that is complementary to the modulation scheme used for that symbol at the transmitter system. The demodulated data from symbol demapping element 732 is then de-interleaved by a deinterleaver 734. The deinterleaved data is further decoded by a decoder 736 to obtain the decoded bits, $\hat{d}_i$, which are estimates of the transmitted information bits, $d_i$. The deinterleaving and decoding are performed in a manner complementary to the interleaving and encoding, respectively, performed at the transmitter system. For example, a Turbo decoder or a Viterbi decoder may be used for decoder 736 if Turbo or convolutional coding, respectively, is performed at the transmitter system.

Figure 8:
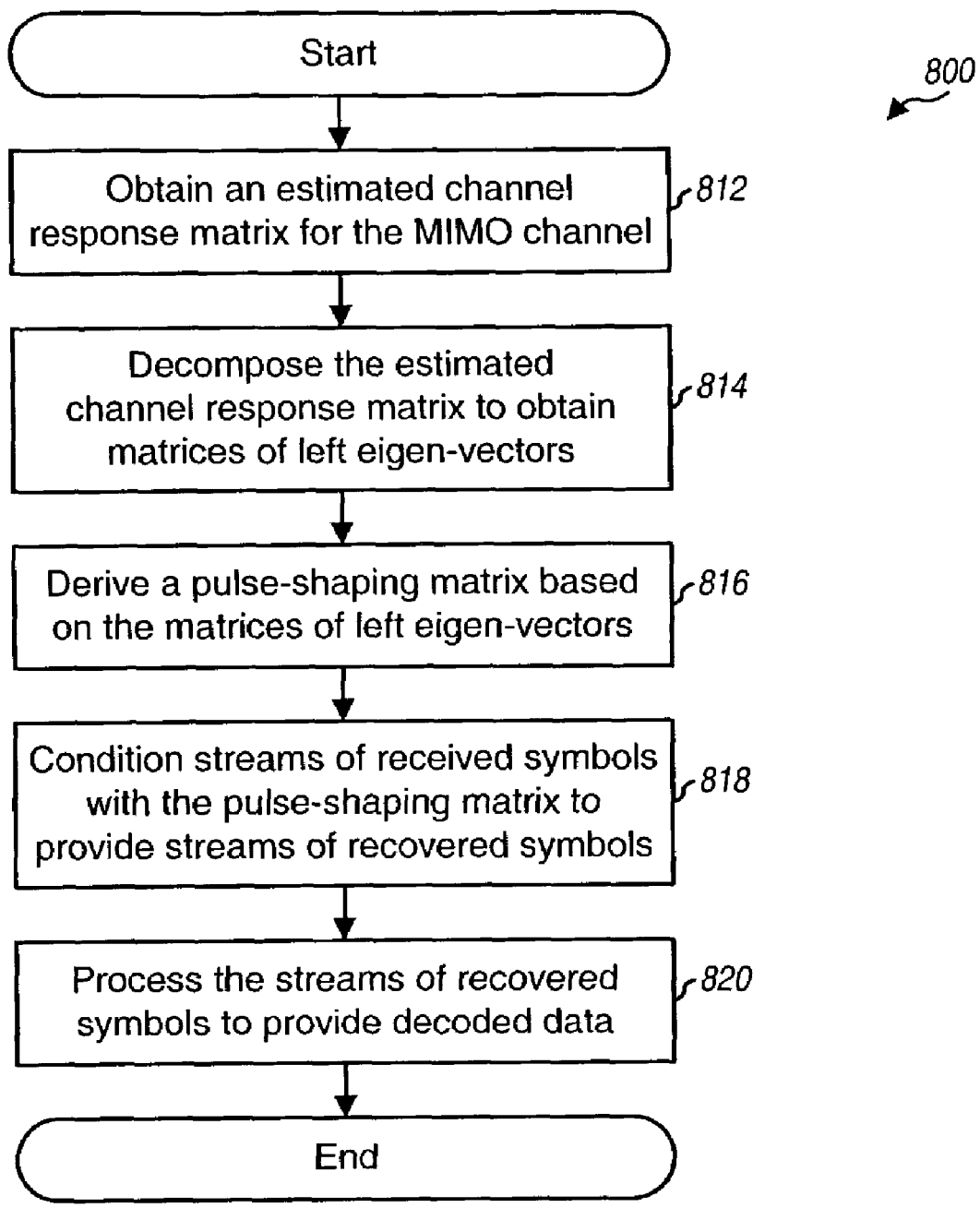
FIG. 8 is a flow diagram of an embodiment of the signal processing at the receiver unit.

FIG. 8 is a flow diagram of a process 800 that may be performed at the receiver unit to implement the various receive processing techniques described herein. Initially, an estimated channel response matrix for the MIMO channel is obtained (step 812). This matrix may be the estimated channel impulse response matrix, $\hat{\underline{\underline{\mathcal{H}}}}$, or the estimated channel frequency response matrix, $\hat{\underline{\underline{H}}}$. The matrix $\hat{\underline{\underline{\mathcal{H}}}}$ or $\hat{\underline{\underline{H}}}$ may be obtained, for example, based on pilot symbols transmitted over the MIMO channel. The estimated channel response matrix is then decomposed (e.g., using channel eigen-decomposition) to obtain a set of matrices of left eigen-vectors, $\underline{\underline{U}}$ (step 814).

A pulse-shaping matrix $\underline{u}(n)$ is then derived based on the matrices of left eigen-vectors, $\underline{\underline{U}}$ (step 816). The streams of received symbols are then conditioned (in either the time domain or frequency domain) based on the pulse-shaping matrix $\underline{u}(n)$ to provide the streams of recovered symbols (step 818). The recovered symbols are further processed in accordance with a particular receive processing scheme, which is complementary to the transmit processing scheme used at the transmitter, to provide the decoded data (step 820).

Time-domain receive processing with channel eigenmode decomposition is described in further detail in the aforementioned U.S. patent application Ser. No. 10/017,038.

The techniques for processing a data transmission at a transmitter and a receiver described herein may be implemented in various wireless communication systems, including but not limited to MIMO and CDMA systems. These techniques may also be used for the forward link and/or the reverse link.

The techniques described herein to process a data transmission at the transmitter and receiver may be implemented by various means. For example, these techniques may be implemented in hardware, software, or a combination thereof. For a hardware implementation, the elements used to perform various signal processing steps at the transmitter (e.g., to code and modulate the data, decompose the channel response matrix, derive the weights to invert the channel, derive the scaling values for power allocation, derive the transmitter pulse-shaping matrix, precondition the modulation symbols, and so on) or at the receiver (e.g., to decompose the channel response matrix, derive the receiver pulse-shaping matrix, condition the received symbols, demodulate and decode the recovered symbols, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, some or all of the signal processing steps at each of the transmitter and receiver may be implemented with modules (e.g., procedures, functions, and so on) that perform the functions described herein. The software codes may be stored in a memory unit (e.g., memories 132 and 172 in FIG. 1) and executed by a processor (e.g., controllers 130 and 170). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a multiple-input multiple-output (MIMO) communication system, a method for processing data for transmission over a MIMO channel, comprising:
 processing data in accordance with a particular processing scheme to provide a plurality of streams of modulation symbols;
 deriving a pulse-shaping matrix based on an estimated channel response matrix of the MIMO channel and a plurality of scaling values used to adjust transmit rower for the MIMO channel, which are based on a plurality of matrices of singular values, wherein the pulse-shaping matrix comprises a plurality of time-ordered sequences of values; and
 preconditioning, according to at least a convolution operation, the plurality of modulation symbol streams, based on the pulse-shaping matrix to provide a plurality of streams of preconditioned symbols for transmission over the MIMO channel.

2. The method of claim 1, further comprising:
 deriving a plurality of weights based on an estimated channel response matrix for the MIMO channel, wherein the weights are used to invert a frequency response of the MIMO channel, and wherein the pulse-shaping matrix is further derived based on the weights.

3. The method of claim 2, further comprising:
 decomposing the estimated channel response matrix to obtain a plurality of matrices of eigen-vectors and the plurality of matrices of singular values, and
 wherein the weights are derived based on the matrices of singular values and the pulse-shaping matrix is further derived based on the matrices of eigen-vectors.

4. The method of claim 2, wherein the estimated channel response matrix is descriptive of a plurality of eigenmodes of the MIMO channel.

5. The method of claim 4, wherein one set of weights is derived for each eigenmode used for data transmission and wherein the weights in each set are derived to invert the frequency response of the corresponding eigenmode.

6. The method of claim 4, wherein the scaling values are used to adjust transmit powers for the eigenmodes of the MIMO channel.

7. The method of claim 6, wherein the scaling values are derived based on water-pouring analysis.

8. The method of claim 3, wherein the estimated channel response matrix is provided in the frequency domain and is decomposed in the frequency domain.

9. The method of claim 3, wherein the estimated channel response matrix is decomposed using channel eigen-decomposition.

10. The method of claim 4, wherein eigenmodes associated with transmission capabilities below a particular threshold are not used for data transmission.

11. The method of claim 3, wherein the singular values in each matrix are sorted based on their magnitude.

12. The method of claim 4, wherein the singular values in each matrix are randomly ordered such that the eigenmodes of the MIMO channel are associated with approximately equal transmission capabilities.

13. The method of claim 1, wherein the pulse-shaping matrix comprises a plurality of time sequences of values representing a response of the MIMO channel at discrete frequencies, and wherein the preconditioning is performed by multiplying a plurality of streams of transformed modulation symbols with the pulse-shaping matrix.

14. The method of claim 1, the MIMO channel having eigenmodes having greater transmission capability and eigenmodes having lesser transmission capabilities, wherein the pulse-shaping matrix is derived to maximize capacity by allocating more transmit power to the eigenmodes of the MIMO channel having greater transmission capabilities.

15. The method of claim 1, wherein the pulse-shaping matrix is derived to provide approximately equal received signal-to-noise-and-interference ratios (SNRs) for the plurality of modulation symbol streams at the receiver.

16. The method of claim 1, wherein the particular processing scheme defines a separate coding and modulation scheme for each modulation symbol stream.

17. The method of claim 1, wherein the particular processing scheme defines a common coding and modulation scheme for all modulation symbol streams.

18. In a multiple-input multiple-output (MIMO) communication system, a method for processing data for transmission over a MIMO channel, comprising:
 processing data in accordance with a particular processing scheme to provide a plurality of streams of modulation symbols;
 obtaining an estimated channel response matrix for the MIMO channel;
 decomposing the estimated channel response matrix to obtain a plurality of matrices of eigen-vectors and a plurality of matrices of singular values;
 deriving a plurality of weights based on the matrices of singular values, wherein the weights are used to invert the frequency response of the MIMO channel;
 deriving a plurality of scaling values based on the matrices of singular values, wherein the scaling values are used to adjust transmit powers for eigenmodes of the MIMO channel;
 deriving a pulse-shaping matrix based on the matrices of eigen-vectors the plurality of scaling values, and the weights, wherein the pulse-shaping matrix comprises a plurality of sequences of time-domain values; and
 preconditioning, according to at least a convolution operation, the plurality of streams of modulation symbols in the time domain, based on the pulse-shaping matrix to provide a plurality of streams of preconditioned symbols for transmission over the MIMO channel.

19. A computer readable media memory storing instructions to be executed by a digital signal processing device (DSPD) capable of interpreting the instructions to perform the steps of:
 processing data in accordance with a particular processing scheme to provide a plurality of streams of modulation symbols;
 deriving a pulse-shaping matrix based on an estimated channel response matrix of the MIMO channel and a plurality of transmit power scaling values, which are based on a plurality of matrices of singular values, wherein the pulse-shaping matrix comprises a plurality of sequences of time-domain values; and
 precondition, according to at least a convolution operation, the plurality of streams of modulation symbols in the time domain, based on the pulse-shaping matrix to provide a plurality of streams of preconditioned symbols for transmission over the MIMO channel.

20. In a multiple-input multiple-output (MIMO) communication system, a method for processing a data transmission received via a MIMO channel, comprising:
 obtaining an estimated channel response matrix for the MIMO channel;
 decomposing the estimated channel response matrix to obtain a plurality of matrices of eigen-vectors;

deriving a time domain pulse-shaping matrix based on the matrices of eigen-vectors; and conditioning, according to at least a convolution operation in the time domain, a plurality of streams of received symbols, based on the time domain pulse-shaping matrix to provide a plurality of streams of recovered symbols which are estimates of preconditioned modulation symbols transmitted for the data transmission, wherein the preconditioned modulation symbols are preconditioned at a transmitter prior to transmission over the MIMO channel, and are based on a plurality of scaling values used to adjust transmit power for the MIMO channel, and wherein the plurality of scaling values are based on a plurality of matrices of singular values.

21. The method of claim 20, wherein the conditioning orthogonalizes a plurality of streams of modulation symbols transmitted over the MIMO channel.

22. The method of claim 20, further comprising:
demodulating the plurality of recovered symbol streams in accordance with one or more demodulation schemes to provide a plurality of demodulated data streams; and
decoding the plurality of demodulated data streams in accordance with one or more decoding schemes to provide decoded data.

23. The method of claim 20, further comprising:
deriving channel state information (CSI) comprised of the estimated channel response matrix for the MIMO channel; and
sending the CSI back to the transmitter.

24. In a multiple-input multiple-output (MIMO) communication system, a method for processing a data transmission received via a MIMO channel, comprising:
obtaining an estimated channel response matrix for the MIMO channel;
decomposing the estimated channel response matrix to obtain a plurality of matrices of eigen-vectors;
deriving a time domain pulse-shaping matrix based on the matrices of eigen-vectors;
conditioning, according to at least a convolution operation in the time domain, a plurality of streams of received symbols, based on the time domain pulse-shaping matrix to provide a plurality of streams of recovered symbols which are estimates of preconditioned modulation symbols transmitted for the data transmission,
wherein the preconditioned modulation symbols are preconditioned at a transmitter prior to transmission over the MIMO channel, and are based on a plurality of scaling values used to adjust transmit power for the MIMO channel, and wherein the plurality of scaling values are based on a plurality of matrices of singular values;
demodulating the plurality of recovered symbol streams in accordance with one or more demodulation schemes to provide a plurality of demodulated data streams; and
decoding the plurality of demodulated data streams in accordance with one or more decoding schemes to provide decoded data.

25. A computer readable media memory storing instructions to be executed by a digital signal processing device (DSPD) capable of interpreting the instructions to perform the steps of:
obtaining an estimated channel response matrix for a multiple-input multiple output (MIMO) channel used for a data transmission;
decomposing the estimated channel response matrix to obtain a plurality of matrices of eigen-vectors;
deriving a time domain pulse-shaping matrix based on the matrices of eigen-vectors; and
conditioning, according to at least a convolution operation in the time domain, a plurality of streams of received symbols, based on the time domain pulse-shaping matrix to provide a plurality of streams of recovered symbols which are estimates of preconditioned modulation symbols transmitted for the data transmission,
wherein the preconditioned modulation symbols are preconditioned at a transmitter prior to transmission over the MIMO channel, and are based on a plurality of scaling values used to adjust transmit power for the MIMO channel, and wherein the plurality of scaling values are based on a plurality of matrices of singular values.

26. A transmitter unit in a multiple-input multiple-output (MIMO) communication system, comprising:
a transmit (TX) data processor operative to process data in accordance with a particular processing scheme to provide a plurality of streams of modulation symbols; and
a TX MIMO processor operative to derive a pulse-shaping matrix based on an estimated response of a MIMO channel, and to precondition, according to at least a convolution operation, the plurality of modulation symbol streams, based on the pulse-shaping matrix and on a plurality of scaling values used to adjust transmit power for the MIMO channel, which are based on a plurality of matrices of singular values, and to provide a plurality of streams of preconditioned symbols for transmission over the MIMO channel,
wherein the pulse-shaping matrix comprises a plurality of sequences of time-domain values, and
wherein the preconditioning is performed in the time domain by convolving the streams of modulation symbols with the pulse-shaping matrix.

27. The transmitter unit of claim 26, wherein the TX MIMO processor is further operative to derive a plurality of weights based on an estimated channel response matrix for the MIMO channel, wherein the weights are used to invert the frequency response of the MIMO channel, and wherein the pulse-shaping matrix is derived based in part on the weights.

28. The transmitter unit of claim 27, wherein the TX MIMO processor is further operative to decompose the estimated channel response matrix to obtain a plurality of matrices of eigen-vectors and the plurality of matrices of singular values, and wherein the weights are derived based on the matrices of singular values and the pulse-shaping matrix is further derived based on the matrices of eigen-vectors.

29. The transmitter unit of claim 27, the MIMO channel having plural eigenmodes, wherein the plurality of scaling values are used to adjust transmit powers for the plural eigenmodes of the MIMO channel.

30. The transmitter unit of claim 29, wherein the scaling values are derived based on water-pouring analysis.

31. An apparatus in a multiple-input multiple-output (MIMO) communication system, comprising:
means for processing data in accordance with a particular processing scheme to provide a plurality of streams of modulation symbols;
means for deriving a pulse-shaping matrix based on an estimated channel response matrix of a MIMO channel and a plurality of scaling values used to adjust transmit rower for the MIMO channel, which are based on a plurality of matrices of singular values, wherein the pulse-shaping matrix comprises a plurality of sequences of time-domain values; and means for preconditioning, according to at least a convolution operation, the plurality of modulation symbol streams in the time domain, based on the pulse-shaping matrix to provide a plurality of streams of preconditioned symbols for transmission over the MIMO channel.

32. A digital signal processor comprising:
means for processing data in accordance with a particular processing scheme to provide a plurality of streams of modulation symbols;
means for deriving a pulse-shaping matrix based on an estimated channel response matrix of a MIMO channel and a plurality of scaling values used to adjust transmit rower for the MIMO channel, which are based on a plurality of matrices of singular values, wherein the pulse-shaping matrix comprises a plurality of sequences of time-domain values; and
means for preconditioning, according to at least a convolution operation, the plurality of modulation symbol streams in the time domain, based on the pulse-shaping matrix to provide a plurality of streams of preconditioned symbols for transmission over the MIMO channel.

33. A receiver unit in a multiple-input multiple-output (MIMO) communication system, comprising:
an RX MIMO processor operative to obtain an estimated channel response matrix for a MIMO channel used for a data transmission, decompose the estimated channel response matrix to obtain a plurality of matrices of eigen-vectors, derive a time domain pulse-shaping matrix based on the matrices of eigen-vectors, and condition, according to at least a convolution operation in the time domain, a plurality of streams of received symbols, based on the pulse-shaping matrix to obtain a plurality of streams of recovered symbols which are estimates of preconditioned modulation symbols transmitted over the MIMO channel,
wherein the modulation symbols were preconditioned at a transmitter prior to transmission over the MIMO channel and are based on a plurality of scaling values used to adjust transmit power for the MIMO channel, and wherein the plurality of scaling values are based on a plurality of matrices of singular values, and
an RX data processor operative to process the plurality of recovered symbol streams in accordance with a particular processing scheme to provide decoded data.

34. An apparatus in a multiple-input multiple-output (MIMO) communication system, comprising:
means for obtaining an estimated channel response matrix for a MIMO channel used for a data transmission;
means for decomposing the estimated channel response matrix to obtain a plurality of matrices of eigen-vectors;
means for deriving a time domain pulse-shaping matrix based on the matrices of eigen-vectors; and
means for conditioning, according to at least a convolution operation in the time domain, a plurality of streams of received symbols, based on the time domain pulse-shaping matrix, to provide a plurality of streams of recovered symbols which are estimates of preconditioned modulation symbols transmitted for the data transmission,
wherein the preconditioned modulation symbols are preconditioned at a transmitter prior to transmission over the MIMO channel, and are based on a plurality of scaling values used to adjust transmit power for the MIMO channel, and wherein the plurality of scaling values are based on a plurality of matrices of singular values.

35. A digital signal processor comprising:
means for obtaining an estimated channel response matrix for a multiple-input multiple-output (MIMO) channel used for a data transmission;
means for decomposing the estimated channel response matrix to obtain a plurality of matrices of eigen-vectors;
means for deriving a time domain pulse-shaping matrix based on the matrices of eigen-vectors; and
means for conditioning, according to at least a convolution operation in the time domain, a plurality of streams of received symbols, based on the time domain pulse-shaping matrix, to provide a plurality of streams of recovered symbols which are estimates of preconditioned modulation symbols transmitted for the data transmission,
wherein the preconditioned modulation symbols are preconditioned at a transmitter prior to transmission over the MIMO channel, and are based on a plurality of scaling values used to adjust transmit power for the MIMO channel, and wherein the plurality of scaling values are based on a plurality of matrices of singular values.

36. The method of claim 1, wherein the pulse-shaping matrix comprises a plurality of sequences of values representing a response of the MIMO channel at discrete points in time, and wherein the preconditioning is performed in the time domain by scaling the plurality of streams at the discrete points in time.

* * * * *

UNITED STATES PATENT AND TRADEMARK OFFICE
CERTIFICATE OF CORRECTION

Page 1 of 1

| | |
|---|---|
| PATENT NO. | : 7,613,248 B2 |
| APPLICATION NO. | : 10/179442 |
| DATED | : November 3, 2009 |
| INVENTOR(S) | : Ketchum |

It is certified that error appears in the above-identified patent and that said Letters Patent is hereby corrected as shown below:

Column 21, line 10, claim 1: "rower" to read as --power--

Column 24, line 64, claim 31: "rower" to read as --power--

Column 25, line 14, claim 32: "rower" to read as --power--

Signed and Sealed this
Tenth Day of May, 2011

David J. Kappos
*Director of the United States Patent and Trademark Office*